(12) United States Patent
Holcomb et al.

(10) Patent No.: US 9,621,953 B1
(45) Date of Patent: Apr. 11, 2017

(54) SYSTEMS AND METHODS FOR ALERTING A USER AND DISPLAYING A DIFFERENT VERSION OF A SEGMENT OF A MEDIA ASSET

(71) Applicant: Rovi Guides, Inc., San Carlos, CA (US)

(72) Inventors: Charles Oliver Holcomb, Tulsa, OK (US); Jennifer Danielle Lamm, Tulsa, OK (US); Courtney R. Vann, Claremore, OK (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 15/140,691

(22) Filed: Apr. 28, 2016

(51) Int. Cl.
*H04N 21/84* (2011.01)
*H04N 21/454* (2011.01)
*H04N 21/482* (2011.01)
*H04N 21/2387* (2011.01)
*H04N 21/488* (2011.01)
*H04N 21/845* (2011.01)

(52) U.S. Cl.
CPC ..... *H04N 21/4542* (2013.01); *H04N 21/2387* (2013.01); *H04N 21/4821* (2013.01); *H04N 21/4882* (2013.01); *H04N 21/84* (2013.01); *H04N 21/8456* (2013.01)

(58) Field of Classification Search
CPC combination set(s) only.
See application file for complete search history.

(56) References Cited

U.S. PATENT DOCUMENTS

| | | | |
|---|---|---|---|
| 9,369,776 B2 * | 6/2016 | Lanier | G06Q 20/102 |
| 2007/0297604 A1 | 12/2007 | Carpenter | |
| 2012/0216222 A1 | 8/2012 | Candelore | |
| 2014/0150009 A1 | 5/2014 | Sharma | |
| 2014/0237501 A1 | 8/2014 | Berrier | |
| 2016/0295268 A1 * | 10/2016 | Lanier | G06Q 20/102 |

OTHER PUBLICATIONS

U.S. Appl. No. 15/140,660, filed Apr. 28, 2016, Charles Oliver Holcomb.

* cited by examiner

*Primary Examiner* — Kieu Oanh T Bui
(74) *Attorney, Agent, or Firm* — Ropes & Gray LLP

(57) ABSTRACT

Systems and methods are presented for presenting segments of an uncensored version of a media asset on a second device while a censored version of the media asset is displayed on a first device. These systems and methods alert a user when segments of the uncensored version of the media asset do not overlap with the censored version, i.e., the uncensored version contains inappropriate content that is censored. Subsequent to alerting the user, the segment of the uncensored version is presented on the second device.

20 Claims, 18 Drawing Sheets

US 9,621,953 B1

SYSTEMS AND METHODS FOR ALERTING A USER AND DISPLAYING A DIFFERENT VERSION OF A SEGMENT OF A MEDIA ASSET

BACKGROUND

Given the plethora of media content available to modern television viewers, parental control systems have become near ubiquitous in electronic program guides (EPGs), which allow users to filter programs based on the content in those programs. In many instances, these conventional parental control systems allow a user to unblock specific versions of the same program for viewing by themselves or others. For example, a parent may unblock a version of a program where profanity is censored for a child to view. Conventional parental control systems allow two users to watch different versions of the same program concurrently. For example, the system may monitor time codes of two different versions of the same program and make adjustments to playback to ensure the two programs remain synchronized.

In some instances, a parent may want to watch a program in the same general location as a child, but wishes to view the uncensored version while the child views the censored version. Using conventional systems, the two separate versions would be delivered to each of the two devices. However, since both users are in the same general location, both users may hear the audio from the other version of the program. If the parent is using headphones, the child may not hear the uncensored version, but the parent may hear the overlapping audio of the censored and uncensored versions at slightly different times, creating an "echo" effect, which he or she may find irritating. Using conventional systems, the parent may manually enable and disable audio, via selection of a "mute" button to prevent the "echo," but this may be an unappealing task for the parent to undertake.

SUMMARY

Accordingly, systems and methods are presented for presenting segments of an uncensored version of a media asset on a second device while a censored version of the media asset is displayed on a first device. These systems and methods allow a user to view only the segments of the uncensored version of the media asset that do not overlap with the censored version, i.e., the inappropriate content that is censored. The system determines segments containing inappropriate content by accessing a data structure containing time codes referencing the starting and ending points of the inappropriate content. During the timeframe defined in the data structure, the system presents the audio portion or the audio and video portion of the uncensored media asset on the second device, but does not present them otherwise. In some instances, the system enables both the audio and video of the uncensored version on the second device throughout the entirety of the media asset, but selectively mutes and unmutes the audio based on determining non-overlapping segments.

For example, a parent and a child are viewing the program, "Kill Bill," in the same room with a censored version of "Kill Bill" being played on a television. There are a number of ways in which the system may be implemented to present segments of the uncensored version of "Kill Bill" to the second device, such as a tablet. In a first case, the system displays video of the uncensored version to the tablet during the entirety of the program, but enables audio only during segments defined in the database as containing inappropriate content. The system continually monitors the progress of the program and compares the progress with segments defined in the database. In this case, during periods where the censored and uncensored audio in "Kill Bill" is identical, the parent can hear the audio from the television and avoid hearing the "echo" when both versions are identical. During segments defined as containing inappropriate content where a difference exists between the censored and uncensored versions, the system also enables the audio of the uncensored version, such that the parent does not miss segments he or she wished to hear.

In a second case, the system displays video and audio of the uncensored version to the second device, but automatically mutes the audio. The system continually monitors the progress of the program and compares the progress with segments defined in the database. During segments defined as containing inappropriate content where a difference exists between the censored and uncensored versions, the system unmutes the audio. The end result to the parent viewing "Kill Bill" is identical to that of the first case, the major difference being that both audio and video are always enabled on the tablet in this case, giving the parent the option to unmute the audio at any point.

In a third case, the system only enables audio and video of the uncensored version of the media asset during segments defined in the database as containing inappropriate content and enables nothing otherwise. The system continually monitors the progress of the program and compares the progress with segments defined in the database. In this case, the parent watches most of "Kill Bill" on the television with the child. At points where the system identifies segments containing inappropriate content where there is a difference between the censored and uncensored versions of "Kill Bill," the system generates for display a notification on the television informing the parent that an uncensored version of the segment is available on the tablet.

In some aspects, a media guidance application generates for display the censored version of the media asset on the first device. The media guidance application may be executed on the first device and a second device simultaneously, or at a location remote from either device (e.g., a remote server), or any suitable combination. For example, the media guidance application requests from a media content source, such as a headend server, the censored version of the movie "Kill Bill." Upon receiving the censored version of "Kill Bill," the media guidance application generates for display "Kill Bill" on the first device (e.g., a set-top box connected to a television), which is viewed by a child, whom a parent does not want to see the uncensored version of "Kill Bill."

In some embodiments, the media guidance application receives a user selection to access the censored version of the media asset. In other embodiments, the media guidance application selects the censored version for display on the first device by default, based on parental control settings. For example, a parent may set a parental control password, such as "1234." Unless that password is inputted, the media guidance application requests the censored version of the media asset.

The media guidance application generates for display the uncensored version of the media asset on the second device, wherein audio of the uncensored version of the media asset is disabled when display is initiated. For example, the media guidance application requests from a media content source, such as a headend server, the uncensored version of "Kill Bill." Upon receiving the uncensored version of "Kill Bill," the media guidance application generates the uncensored version of "Kill Bill" for display on the second device (e.g., a tablet), which is viewed by the parent.

The media guidance application disables audio of the uncensored version of the media asset when display is initiated. For example, the media guidance application, upon initiating display of the uncensored version of "Kill Bill" on the tablet, may generate for display the video component of the movie, but may disable the audio, such that the parent viewing the tablet hears the audio from the television only and not both devices concurrently.

In some embodiments, the media guidance application, subsequent to a selection of the media asset, determines that the uncensored version of the media asset contains an audio component and a video component. For example, the media guidance application generates for display the video component corresponding to the visual portion of the media asset on the second device. For example, the media guidance application may identify the contents of packets received from a media content source based on an identifier in the packets. For packets identified as relating to the visual portion of the media asset, the media guidance application generates for display the visual information contained in the packets on the second device. The media guidance application prevents output of the audio component corresponding to the audio portion of the media asset to the second device. For example, the media guidance application may identify the contents of packets received from a media content source based on an identifier in the packets. For packets identified as relating to audio of the media asset, the media guidance application prevents output of the audio information contained in the packets on the second device.

The media guidance application determines a first time code indicating current progress of the media asset being displayed. For example, the media guidance application may determine from a first time code that the current progress point in "Kill Bill" is thirty minutes from the beginning of the movie. The time code may be a numerical representation of the number of frames of the movie presented at a particular point in time. In the example above, the media guidance application may retrieve the time code (00:30:00:00) corresponding to (hour:minute:second:frame).

In some embodiments, the media guidance application retrieves from a time code signal in the media asset, a set of binary coded decimal values referring to a present playback position in the media asset. For example, the media guidance application may determine that a particular signal or header in a data packet contains binary coded decimal values and retrieve those values. The media guidance application converts each binary coded decimal value to a corresponding decimal value corresponding to the first time code. For example, the media guidance application may determine that four particular bits relating to one value in the time code are "1001" which may correspond to the value "9" in the time code.

The media guidance application accesses, from a database containing a plurality of data structures associated with media assets, a first data structure corresponding to the media asset. For example, the media guidance application may access a database, which may be stored locally in memory, or remotely at a media guidance data source accessible via a communications network. The database may be organized into a variety of tables each associated with a media asset and where an index table points to the tables associated with media assets contained in the database. Alternatively, the database may be organized where data relating to each media asset is stored in an instance of an object of a media asset information class, as is typical of object-oriented programming languages such as C++.

The media guidance application determines, from the first data structure, whether the first time code is adjacent to or equivalent to a starting point of a segment in the media asset including inappropriate content. For example, the media guidance application may determine that "Kill Bill" is currently at a particular progress point given by the first time code, such as (00:33:10:10). The media guidance application may determine that because (00:33:10:10) is defined in the first data structure as the beginning of a segment containing profanity, the progress in "Kill Bill" corresponds to a segment containing inappropriate content.

In some embodiments, the media guidance application compares the first time code to a plurality of starting points stored in the first data structure. For example, the media guidance application may determine that "Kill Bill" is currently at a particular progress point given by the first time code, such as (00:33:10:10). The media guidance application may retrieve a starting point of a segment from a starting point field in a table corresponding to "Kill Bill."

The media guidance application may retrieve a value of the first starting point from the first data structure. For example, the media guidance application may retrieve an array containing four integers, such as 0, 33, 15, 10 corresponding to hours, minutes, seconds, frames as determined from the time code signal in the media asset. The media guidance application may then compute an adjusted first starting point by subtracting a first time offset from the first starting point. For example, if the first time offset is five seconds, then the media guidance application would subtract five seconds from the first starting point, giving a new set of integers. In the example above, the media guidance application would compute an adjusted first starting point of 0, 33, 10, 10. The media guidance application then compares the first time code to the adjusted first starting point. For example, the first time code had the values 00:33:10:10, which when subtracted by the media guidance application from the adjusted first starting point, would give zero values in all categories. In this example, the media guidance application would determine the first time code is equivalent to the adjusted first starting point.

In some embodiments, the media guidance application may present to the user a plurality of time offset options. For example, the media guidance application may present to the user options such as "10 seconds" or "1 minute," which the user may select in order to enable the audio before the segment containing inappropriate content, such that the user is not caught by surprise by the inappropriate content. The media guidance application receives a user selection of a first time offset option of the plurality of time offset options. For example, the media guidance application may receive a user selection, via a user input interface, of the option "10 seconds." The media guidance application stores, in a time offset field of a user profile stored in the database, the time offset option as the first time offset. For example, the media guidance application may store the user selection of "10 seconds" in a user profile corresponding to the user stored in a database of user profiles either locally in storage or remotely at a media guidance data source. The media guidance application, when making the comparison between time codes and starting points, may then retrieve the stored first offset value and calculate the adjusted first starting point.

The media guidance application determines whether the first time code is adjacent to or equivalent to a first starting point of the plurality of starting points. For example, if the starting point of the segment retrieved was (00:55:10:10), the media guidance application may determine that the first time code is not adjacent or equivalent to the starting point based on the difference, 20 minutes, being greater than a threshold time difference at which the first time code would be considered adjacent to the starting point. Alternatively, if the starting point retrieved was (00:33:10:15) and the threshold was 10 frames, the media guidance application may determine that the first time code is adjacent to the starting point, since they are only five frames apart.

The media guidance application determines whether the first starting point is associated with inappropriate content. For example, the media guidance application may retrieve the contents of an inappropriate content field relating to the first starting point by executing a database query language script, such as SQL, utilizing the declarative "Select" command to access data in the particular expression (e.g., the inappropriate content field). The media guidance application may determine, from the retrieved contents of the inappropriate content field, the starting point is associated with inappropriate content. For example, the media guidance application may retrieve a boolean variable set to "true," indicating that the first starting point is associated with inappropriate content.

The media guidance application, in response to determining that the first time code is adjacent to or equivalent to the first starting point and is associated with inappropriate content, determines that the first starting point is adjacent to or equivalent to the starting point of the segment containing inappropriate content. For example, the media guidance application may determine that the first starting point retrieved from the data structure, 00:33:10:10 is equivalent to the first time 00:33:10:10. The media guidance application may also determine that the first starting point is associated with inappropriate content, based on a Boolean variable set to "true" in an inappropriate content field of the first data structure corresponding to the media asset. Based on these two determinations, the media guidance application may determine that the first starting point is equivalent to the starting point of the segment containing inappropriate content.

The media guidance application, in response to determining that the first time code is adjacent to or equivalent to the starting point of the segment, enables audio of the segment in the media asset including the inappropriate content. For example, the media guidance application may enable output of audio on the second device during the segment. Alternatively, the media guidance application may enable output of the audio already, but with an instruction to mute the audio at the second device. In this instance, the media guidance application may execute instructions to unmute the audio during the segment.

In some embodiments, the media guidance application may generate an enable instruction based on determining the first time code is adjacent to or equivalent to a starting point of a segment in the media asset including inappropriate content. For example, the media guidance application generates an instruction to enable the audio during the segment subsequent to determining the segment contains inappropriate content and the first time code matches the starting point of the segment. The media guidance application, in response to receiving the enable instruction, enables the audio portion of the uncensored version of the media asset. For example, the media guidance application executes the enable instruction which enables audio during the segment. The instruction may contain an instruction to unmute audio that already is being received by the second device during the segment.

In some embodiments, the media guidance application retrieves, from the first data structure, a plurality of segments containing inappropriate content. For example, the media guidance application may determine five segments in the media asset containing inappropriate content. The media guidance application may make this determination subsequent to selection of the media asset by the user. The media guidance application generates the enable instruction for each of the plurality of segments. For example, the media guidance application generates an enable instruction for each segment of the five segments containing inappropriate content. The instruction may contain an instruction to unmute audio of the media asset during the segment and mute audio once the segment is completed. The media guidance application may generate the instructions prior to selection of the media asset by the user or subsequent to selection by the user. The media guidance application stores the enable instruction for each of the plurality of segments in an enable instruction list. For example, the media guidance application may generate a single data structure, such as a list, containing enable instructions for each segment containing inappropriate content in the media asset and store the instructions locally in storage or at a media guidance data source accessible via a communications network. The media guidance application executes the enable instruction list on the second device. For example, the media guidance application executes, via control circuitry, the enable instruction list on the second device to enable audio during the plurality of segments containing inappropriate content.

In some embodiments, the media guidance application queries the second device for connection information relating to peripheral devices. For example, the media guidance application may execute a database query language script, such as SQL, utilizing the declarative "Select" command to access data in a particular expression in a table (e.g., a peripheral device table for the second device). The media guidance application may determine from values accessed whether a peripheral device is connected to the second device. The media guidance application determines, from the connection information, whether headphones are connected to the second device. For example, the media guidance application may retrieve a string variable "headphones" identifying the type of connection, in addition to information about the operating parameters (such as the transmitting frequency if the connection is wireless). Based on the "headphones" identifier, the media guidance application determines that headphones are connected to the second device. If the media guidance application determines that headphones are not connected to the second device, the media guidance application does not enable the audio portion of the uncensored version of the media asset. For example, the media guidance application may execute an instruction to override the enabling of audio during the segment containing inappropriate content.

The media guidance application subsequent to enabling audio of the segment, determines a second time code indicating current progress of the media asset being displayed. For example, the media guidance application continuously monitors the current progress in the media asset by determining time codes according to the process outlined above for determining the first time code. At a given point, the media guidance application determines a second time code, which may have a value of (00:33:30:15).

The media guidance application determines, from the first data structure, whether the second time code is adjacent to or equivalent to an ending point of the segment. The media guidance application determines that the second time code is adjacent to or equivalent to an ending point of the segment in an analogous manner to how the media guidance application determines the first time code is adjacent to or equivalent to the starting point. For example, the media guidance application may determine that, since the value for the ending point stored in the first data structure is (00:33:30:15) and the value of the second time code is also (00:33:30:15), that the second time code is equivalent to the ending point.

The media guidance application, upon determining that the second time code is adjacent to or equivalent to the ending point of the segment, disables audio of the segment in the media asset including the inappropriate content. For example, the media guidance application may cease enabling the audio portion of "Kill Bill" to the parent's tablet upon determining the second time code is adjacent to or equivalent to the ending point of the segment. As another example, the media guidance application may mute the audio portion of "Kill Bill" enabled on the tablet upon determining the second time code is adjacent to or equivalent to the ending point of the segment.

In some embodiments, the media guidance application presents the user with a selectable option to override the disabling of the uncensored audio. For example, the media guidance application generates for display a graphic indicating that the parent can override the disabling of audio and enable the audio during scenes where the uncensored and censored versions of the media asset may not differ. The media guidance application receives a user selection of the option to override the disabling. For example, the parent, via a user input interface, selects the option to override the disabling of the uncensored audio. The media guidance application, in response to receiving a selection of the option to override the disabling of the uncensored audio, enables the uncensored audio on the tablet.

In some aspects, a media guidance application generates for display the censored version of the media asset on the first device. The media guidance application may be executed on the first device and a second device simultaneously, or at a location remote from either device (e.g., a remote server), or any suitable combination. For example, the media guidance application requests from a media content source, such as a headend server, the censored version of the movie "Kill Bill." Upon receiving the censored version of "Kill Bill," the media guidance application generates the censored version of "Kill Bill" for display on the first device (e.g., a television), which is viewed by a child, whom a parent does not want to see the uncensored version of "Kill Bill," as well as by the parent during segments where the uncensored and censored versions are similar.

The media guidance application determines a first time code indicating current progress of the media asset being displayed. For example, the media guidance application may determine from a first time code that the current progress point in "Kill Bill" is thirty minutes from the beginning of the movie. The time code may be a numerical representation of the number of frames of the movie presented at a particular point in time. In the example above, the media guidance application may retrieve the time code (00:30:00:00) corresponding to (hour:minute:second:frame).

In some embodiments, the media guidance application retrieves from a time code signal in the media asset, a set of binary coded decimal values referring to a present playback position in the media asset. For example, the media guidance application may determine that a particular signal or header in a data packet contains binary coded decimal values and retrieve those values. The media guidance application converts each binary coded decimal value to a corresponding decimal value corresponding to the first time code. For example, the media guidance application may determine that four particular bits relating to one value in the time code are "1001," which may correspond to the value "9" in the time code.

The media guidance application accesses, from a database containing a plurality of data structures associated with media assets, a first data structure corresponding to the media asset. For example, the media guidance application may access a database, which may be stored locally in memory, or remotely at a media guidance data source accessible via a communications network. The database may be organized into a variety of tables, each associated with a media asset and where an index table points to the tables associated with media assets contained in the database. Alternatively, the database may be organized where data relating to each media asset is stored in an instance of an object of a media asset information class, as is typical of object-oriented programming languages such as C++.

The media guidance application determines, from the first data structure, whether the first time code is adjacent to or equivalent to a starting point of a segment in the media asset including inappropriate content. For example, the media guidance application may determine that the movie is currently at a particular progress point given by the first time code, such as (00:33:10:10). The media guidance application may determine that, because (00:33:10:10) is defined in the first data structure as the beginning of a segment containing profanity, the progress in "Kill Bill" corresponds to a segment containing inappropriate content.

In some embodiments, the media guidance application compares the first time code to a plurality of starting points stored in the first data structure. For example, the media guidance application may determine that "Kill Bill" is currently at a particular progress point given by the first time code, such as (00:33:10:10). The media guidance application may retrieve a starting point of a segment from a starting point field in a table corresponding to the movie.

The media guidance application may retrieve a value of the first starting point from the first data structure. For example, the media guidance application may retrieve values in an array containing four integers, such as 0, 33, 15, 10, corresponding to hours, minutes, seconds, frames as determined from the time code signal in the media asset. The media guidance application may then compute an adjusted first starting point by subtracting a first time offset from the first starting point. For example, if the first time offset is five seconds, then the media guidance application would subtract five seconds from the first starting point, giving a new set of integers. In the example above, the media guidance application would compute values for an adjusted first starting point of 0, 33, 10, 10. The media guidance application then compares the first time code to the adjusted first starting point. For example, the first time code had the values 00:33:10:10, which when subtracted by the media guidance application from the adjusted first starting point, would give zero values in all categories. In this example, the media guidance application would determine the first time code is equivalent to the adjusted first starting point.

In some embodiments, the media guidance application may present to the user a plurality of time offset options. For example, the media guidance application may present to the user options such as "10 seconds" or "1 minute," which the user may select in order to enable the audio before the segment containing inappropriate content, such that the user is not caught by surprise by the inappropriate content. The media guidance application receives a user selection of a first time offset option of the plurality of time offset options. For example, the media guidance application may receive a user selection, via a user input interface, of the option "10 seconds." The media guidance application stores, in a time offset field of a user profile stored in the database, the time offset option as the first time offset. For example, the media guidance application may store the user selection of "10 seconds" in a user profile corresponding to the user stored in a database of user profiles either locally in storage or remotely at a media guidance data source. The media guidance application, when making the comparison between time codes and starting points, may then retrieve the stored first offset value and calculate the adjusted first starting point.

In some embodiments, the media guidance application determines whether the first time code is adjacent to or equivalent to a first starting point of the plurality of starting points. For example, if the starting point of the segment retrieved was (00:55:10:10), the media guidance application may determine that the first time code is not adjacent or equivalent to the starting point based on the difference, 20 minutes, being greater than a threshold time difference at which the first time code would be considered adjacent to the starting point. Alternatively, if the starting point retrieved was (00:33:10:15) and the threshold was 10 frames, the media guidance application may determine that the first time code is adjacent to the starting point, since they are only five frames apart.

In some embodiments, the media guidance application determines whether the first starting point is associated with inappropriate content. For example, the media guidance application may retrieve the contents of an inappropriate content field relating to the first starting point by executing a database query language script, such as SQL, utilizing the declarative "Select" command to access data in the particular expression (e.g., the inappropriate content field). The media guidance application may determine, from the retrieved contents of the inappropriate content field, that the starting point is associated with inappropriate content. For example, the media guidance application may retrieve a boolean variable set to "true," indicating that the first starting point is associated with inappropriate content.

In some embodiments, the media guidance application, in response to determining that the first time code is adjacent to or equivalent to the first starting point and is associated with inappropriate content, determines that the first starting point is adjacent to or equivalent to the starting point of the segment containing inappropriate content. For example, the media guidance application may determine that the first starting point retrieved from the data structure, 00:33:10:10, is equivalent to the first time 00:33:10:10. The media guidance application may also determine that the first starting point is associated with inappropriate content, based on a Boolean variable set to "true" in an inappropriate content field of the first data structure corresponding to "Kill Bill." Based on these two determinations, the media guidance application may determine that the first starting point is equivalent to the starting point of the segment containing inappropriate content.

The media guidance application, in response to determining that the first time code is adjacent to or equivalent to the starting point of the segment, generates for display an alert that the segment of the media asset is available for access on the second device. For example, the media guidance application generates for display the alert, which graphically notifies the parent watching the censored version of "Kill Bill" with the child on the television that an uncensored version of the segment is available on the second device, the parent's tablet. The graphical notification could include text, such as, "Uncensored content is available on you tablet."

In some embodiments, the media guidance application generates for display on the alert a selectable option to generate for display the uncensored version on the second device. For example, the media guidance application generates for display a selectable button containing text, "Yes, Transmit." The media guidance application may additionally include a selectable option to close the alert. The option to close the alert could include text, such as, "No, Close." The media guidance application receives a user selection of the selectable option to generate for display the uncensored version on the second device. For example, the media guidance application receives a selection by the parent, via a user input interface, to "Yes, Transmit" the uncensored content. The media guidance application, in response to receiving the user selection, generates for display the uncensored version on the second device. For example, after selection of the "Yes, Transmit" option by the parent, the media guidance application generates for display the uncensored version of the media asset on the parent's tablet.

In some embodiments, the media guidance application retrieves, from the first data structure, a content identifier relating to the inappropriate content in the segment. For example, the media guidance application retrieves an identifier of the inappropriate content from a content identifier field by executing a database query language script, such as SQL, for instance, utilizing the declarative "Select" command to access data in the particular expression (e.g., the content identifier field). The media guidance application may retrieve a string, such as "Profanity." The media guidance application generates for display on the alert the content identifier. For example, the media guidance application generates for display the text, "This segment of the uncensored version contains: Profanity," which informs the parent what sort of inappropriate content they will miss by continuing to view the censored version with the child.

In some embodiments, the media guidance application generates for display a selectable option to display the inappropriate content from the uncensored version on the first device. For example, the media guidance application generates for display with the alert a selectable option including text, "Swap versions." The media guidance application receives a user selection of the selectable option to display the inappropriate content. For example, the media guidance application receives a selection by the parent, via a user input interface, to "Swap versions" of "Kill Bill." The media guidance application, in response to receiving the user selection, generates for display the uncensored version on the first device. For example, the media guidance application may generate for display the uncensored version of "Kill Bill" on the first device instead of the censored version. The media guidance application may continue to generate for display the uncensored version of the media asset on the second device (e.g., the parent's tablet). Alternatively, the media guidance application may generate for display the censored version of the media asset on the second device (e.g., the parent's tablet).

The media guidance application, in response to determining that the first time code is adjacent to or equivalent to the starting point of the segment, generates for display the segment of the media asset on the second device. For example, the media guidance application requests from a media content source, such as a headend server, the uncensored version of "Kill Bill." The media guidance application then generates for display the segment of the uncensored version on the second device (e.g., a tablet) accessible by the parent.

In some embodiments, the media guidance application queries the second device for connection information relating to peripheral devices. For example, the media guidance application may execute a database query language script, such as SQL, utilizing the declarative "Select" command to access data in a particular expression in a table (e.g., a peripheral device table for the second device). The media guidance application may determine from values accessed whether a peripheral device is connected to the second device. The media guidance application determines, from the connection information, whether headphones are connected to the tablet. For example, the media guidance application may retrieve a string variable "headphones" identifying the type of connection, in addition to information about the operating parameters (such as the transmitting frequency if the connection is wireless). Based on the "headphones" identifier, the media guidance application determines that headphones are connected to the parent's tablet. If the media guidance application determines that headphones are not connected to the second device, the media guidance application does not enable the audio portion of the uncensored version of the media asset. For example, the media guidance application may execute an instruction to override the enabling of audio during the segment containing inappropriate content.

In some embodiments, the media guidance application retrieves, from a time code signal in the uncensored version of the media, a first version time code corresponding to an uncensored version playback position. For example, the media guidance application retrieves the first version time code, for example (00:33:30:10), in the manner described previously for determining time codes. The media guidance application concurrently retrieves, from a time code signal in the censored version of the media asset, a second version time code corresponding to a censored version playback position. For example, the media guidance application retrieves the second version time code, for example (00:33:29:10). The media guidance application computes a playback delay between the censored and uncensored versions of the media asset by subtracting the second version time code from the first version time code. For example, the media guidance application subtracts the values in the time codes and determines a playback delay of +1 second. The playback delay could arise because of unequal lengths in the runtime of the uncensored segments versus the censored segments. The media guidance application delays playback of either the censored version or the uncensored version such that the playback delay is minimized. For example, the media guidance application may play the censored version of the media asset at a slightly slower speed (e.g., 0.9× the typical speed) until the one second delay is minimized (e.g., the two versions are perfectly synchronized).

The media guidance application, in response to determining that the first time code is adjacent to or equivalent to the starting point of the segment, determines a second time code of the media asset being displayed. For example, the media guidance application continuously monitors the current progress in the media asset by determining time codes according to the process outlined above for determining the first time code. At a given point, the media guidance application determines a second time code, which, for example, may have a value of (00:33:30:15).

The media guidance application, upon determining that the second time code is adjacent to or equivalent to the ending point, ceases generating for display the uncensored version of the media asset on the second device. For example, the media guidance application determines that the segment containing the inappropriate content has ended and automatically ceases generating for display the uncensored version of "Kill Bill" on the second device (e.g., mobile phone or tablet). The media guidance application continues to generate for display the censored version on the television, which the parent and child can watch together on the same screen during segments without inappropriate content, since there is no difference in content between the versions during these segments.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
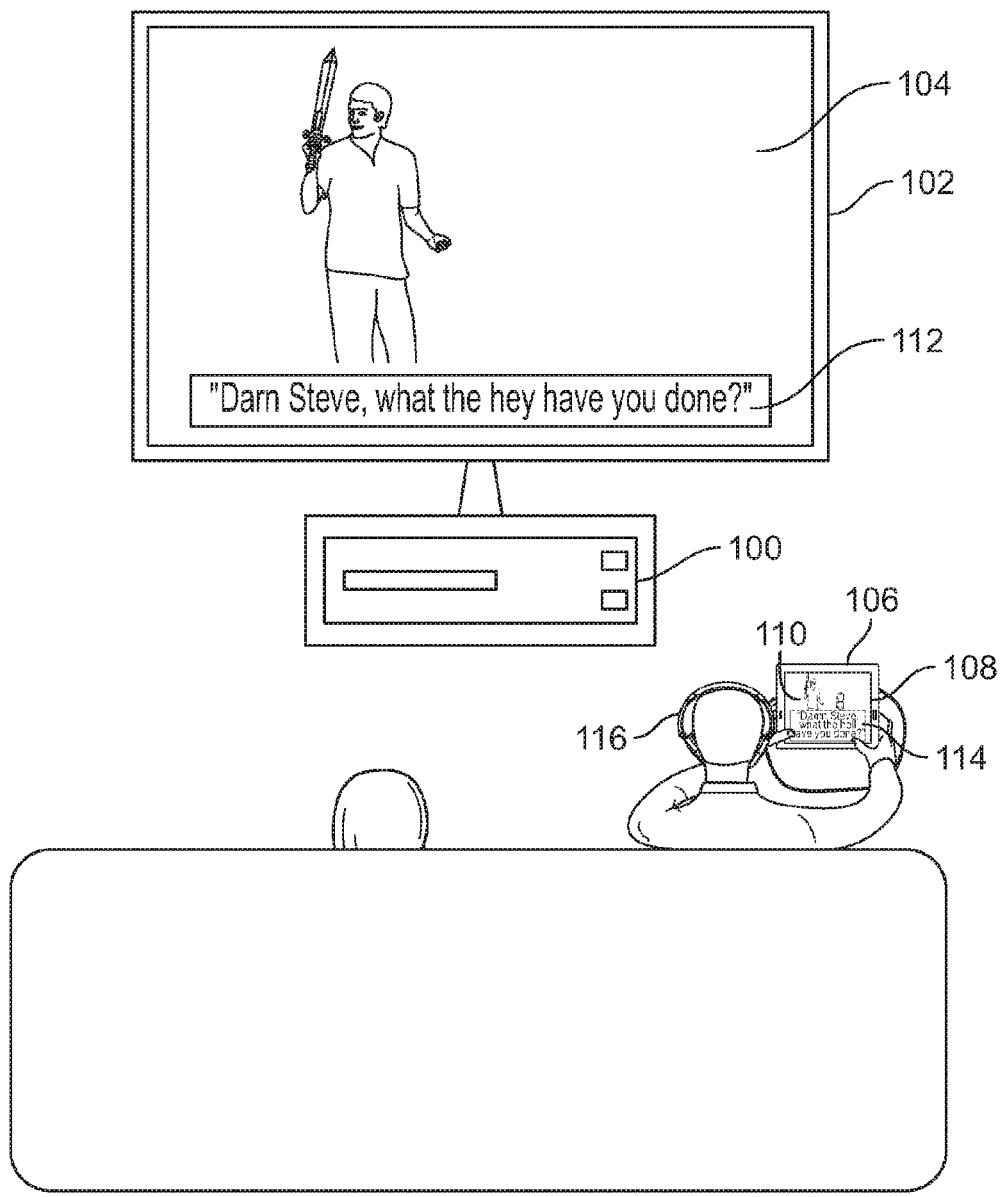
FIG. 1 shows an illustrative example of user equipment devices displaying a media asset in accordance with some embodiments of the disclosure.

Accordingly, systems and methods are presented for presenting segments of an uncensored version of a media asset on a second device while a censored version of the media asset is displayed on a first device. These systems and methods allow a user to view only the segments of the uncensored version of the media asset that do not overlap with the censored version, i.e., the inappropriate content that is censored. The system determines segments containing inappropriate content by accessing a data structure containing time codes referencing the starting and ending points of the inappropriate content. During the timeframe defined in the data structure, the system presents the audio portion or the audio and video portion of the uncensored media asset on the second device, but does not present them otherwise. In some instances, the system enables both the audio and video of the uncensored version on the second device throughout the entirety of the media asset, but selectively mutes and unmutes the audio based on determining non-overlapping segments.

For example, a parent and a child are viewing the program, "Kill Bill," in the same room with a censored version of "Kill Bill" being played on a television. There are a number of ways in which the system may be implemented to present segments of the uncensored version of "Kill Bill" to the second device, such as a tablet. In a first case, the system displays video of the uncensored version to the tablet during the entirety of the program, but enables audio only during segments defined in the database as containing inappropriate content. The system continually monitors the progress of the program and compares the progress with segments defined in the database. In this case, during periods where the censored and uncensored audio in "Kill Bill" is identical, the parent can hear the audio from the television and avoid hearing the "echo" when both versions are identical. During segments defined as containing inappropriate content where a difference exists between the censored and uncensored versions, the system also enables the audio of the uncensored version, such that the parent does not miss segments he or she wished to hear.

In a second case, the system displays video and audio of the uncensored version to the second device, but automatically mutes the audio. The system continually monitors the progress of the program and compares the progress with segments defined in the database. During segments defined as containing inappropriate content where a difference exists between the censored and uncensored versions, the system unmutes the audio. The end result to the parent viewing "Kill Bill" is identical to that of the first case, the major difference being that both audio and video are always enabled on the tablet in this case, giving the parent the option to unmute the audio at any point.

In a third case, the system only enables audio and video of the uncensored version of the media asset during segments defined in the database as containing inappropriate content and enables nothing otherwise. The system continually monitors the progress of the program and compares the progress with segments defined in the database. In this case, the parent watches most of "Kill Bill" on the television with the child. At points where the system identifies segments containing inappropriate content where there is a difference between the censored and uncensored versions of "Kill Bill," the system generates for display a notification on the television informing the parent that an uncensored version of the segment is available on the tablet.

As referred to herein, a "media guidance application," or an "interactive media guidance application" or, sometimes, a "media guidance application" or a "guidance application" is an application that allows a user to consume, and/or navigate to, media assets. In some embodiments, the media guidance application may be provided as an online application (i.e., provided on a website), or as a stand-alone application on a server, user device, etc. In some embodiments, the media guidance application may be executed on the first device and a second device simultaneously, or at a location remote from either device (e.g., a remote server), or any suitable combination. In some embodiments, control circuitry installed on various devices and platforms may execute the media guidance application, as described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

FIG. 1 shows an illustrative example of user equipment devices displaying a media asset in accordance with some embodiments of the disclosure. For example, set-top box 100 generates for display on display 102 a media guidance application displaying censored version 104 of the media asset, "Kill Bill." Tablet 106 generates for display on display 108 the uncensored version 110 of the media asset, "Kill Bill." Display 102 and display 108 may appear on any of the user equipment devices listed in FIGS. 9-10 below. Moreover, the media guidance application may use one or more of the processes described in FIGS. 11-20 below to generate display 102 and 108 or any of the features described therein.

FIG. 1 includes set-top box 100 which generates for display on display 102 censored version 104 of the media asset "Kill Bill." Display 102 may appear on a display device (e.g., user equipment devices 1002, 1004, and/or 1006 (FIG. 10) below). Furthermore, control circuitry 904, as described below in relation to FIG. 9, may be used to generate a display 102. Display 102 includes censored version 104 presented by the media guidance application. FIG. 1 also includes tablet 106 which generates for display on display 108 uncensored version 110 of the media asset "Kill Bill." Display 108 may appear on a display device (e.g., user equipment devices 1002, 1004, and/or 1006 (FIG. 10) below). Furthermore, control circuitry 904, as described below in relation to FIG. 9, may be used to generate a display 108. Display 108 includes censored version 110 presented by the media guidance application.

In some aspects, a media guidance application generates for display the censored version of the media asset on the first device. For example, the media guidance application may receive a request by the first user (e.g., via user input interface 910) to view censored version 104. The media guidance application then requests from a media content source (e.g., media content source 1016 as described below in relation to FIG. 10), such as a headend server, censored version 104. Upon receiving censored version 104, the media guidance application generates censored version 104 for display on display 102, which is viewed by a child, whom a parent does not want to see uncensored version 110.

In some embodiments, the media guidance application receives a user selection (e.g., via user input interface 910) to access censored version 104. In other embodiments, the media guidance application selects censored version 104 for display on the first device by default, based on parental control settings. For example, a parent may set a parental control password, such as "1234." Unless that password is inputted, the media guidance application requests censored version 104.

The media guidance application generates for display the uncensored version of the media asset on the second device, wherein audio of the uncensored version of the media asset is disabled when display is initiated. For example, the media guidance application requests from a media content source (e.g., media content source 1016 as described below in relation to FIG. 10), such as a headend server, uncensored version 110 of media asset "Kill Bill." In this example, censored version 104 and uncensored version 108 of the same media asset, "Kill Bill" are presented; however, one of skill in the art will appreciate that any two non-identical versions of the same media asset could be presented using the disclosed systems and methods. Upon receiving uncensored version 110, the media guidance application generates uncensored version 110 for display on display 108, which is viewed by the parent.

The media guidance application disables audio of the uncensored version of the media asset when display is initiated. For example, the media guidance application, upon initiating display of the uncensored version 110 on display 108, may generate for display the video component of uncensored version 110, but may disable the audio, such that the parent viewing the tablet hears the audio from display 102 only and not both devices concurrently.

In some embodiments, the media guidance application, subsequent to a selection of the media asset, determines that the uncensored version of the media asset contains an audio component and a video component. For example, the media guidance application generates for display the video component corresponding to the visual portion of the media asset on tablet 106. For example, the media guidance application may identify the contents of packets received from a media content source (e.g., media content source 1016 as described further below in FIG. 10) based on an identifier in the packets. For packets identified as relating to the visual portion of the media asset, the media guidance application generates for display the visual information contained in the packets on tablet 106. The media guidance application prevents output of the audio component corresponding to the audio portion of the media asset on tablet 106. For example, the media guidance application may identify the contents of packets received from a media content source (e.g., media content source 1016 as described further below in FIG. 10) based on an identifier in the packets. For packets identified as relating to audio of the media asset, the media guidance application prevents output of the audio information contained in the packets on tablet 106.

The media guidance application determines a first time code indicating current progress of the media asset being displayed. For example, the media guidance application may determine from a first time code that the current progress point in "Kill Bill" is thirty minutes from the beginning of the movie. The time code may be a numerical representation of the number of frames of the movie presented at a particular point in time. In the example above, the media guidance application may retrieve the time code (00:30:00:00) corresponding to (hour:minute:second:frame).

In some embodiments, the media guidance application retrieves from a time code signal in the media asset, a set of binary coded decimal values referring to a present playback position in the media asset. For example, the media guidance application may determine that a particular signal or header in a data packet contains binary coded decimal values and retrieve those values. The media guidance application converts each binary coded decimal value to a corresponding decimal value corresponding to the first time code. For example, the media guidance application may determine that four particular bits relating to one value in the time code are "1001," which may correspond to the value, "9" in the time code.

The media guidance application accesses, from a database containing a plurality of data structures associated with media assets, a first data structure corresponding to the media asset. For example, the media guidance application may access a database, which may be stored locally in memory (e.g., storage 908), or remotely at a media guidance data source (e.g., media guidance data source 1018) accessible via a communications network (e.g., communications network 1014), as described further in FIGS. 9-10 below. The database may be organized into a variety of tables, each associated with a media asset and where an index table points to the tables associated with media assets contained in the database, as described further in FIG. 6 below. Alternatively, the database may be organized where data relating to each media asset is stored in an instance of an object of a media asset information class, as is typical of object-oriented programming languages such as C++.

The media guidance application determines, from the first data structure, whether the first time code is adjacent to or equivalent to a starting point of a segment in the media asset including inappropriate content. For example, the media guidance application may determine that "Kill Bill" is currently at a particular progress point given by the first time code, such as (00:33:10:10). The first time code used for purposes of comparison with the stored time codes in the first data structure may be the current progress point of censored version 104 or uncensored version 110. The media guidance application may determine that because (00:33:10:10) is defined in the first data structure as the beginning of a segment containing profanity, the progress in "Kill Bill" corresponds to a segment containing inappropriate content.

The media guidance application, in response to determining that the first time code is adjacent to or equivalent to the starting point of the segment, enables audio of the segment in the media asset including the inappropriate content. For example, the media guidance application may enable output of audio on the second device during the segment. The media guidance application enables output of audio on tablet 106 during a segment of "Kill Bill" where the dialogue includes profanity, such as profanity 114, "Damn Steve, what the hell have you done?" Alternatively, the media guidance application may enable output of the audio already, but with an instruction to mute the audio at the second device. In this instance, the media guidance application may execute instructions to unmute the audio during the segment, such that the parent hears profanity 114, while the child hears censored profanity 112.

In some embodiments, the media guidance application may generate an enable instruction based on determining the first time code is adjacent to or equivalent to a starting point of a segment in the media asset including inappropriate content. For example, the media guidance application generates an instruction to enable the audio during the segment subsequent to determining the segment contains inappropriate content (e.g., profanity 114) and the first time code matches the starting point of the segment. The media guidance application, in response to receiving the enable instruction, enables the audio portion of the uncensored version of the media asset. For example, the media guidance application executes the enable instruction, which enables audio during the segment. The media guidance application enables output of audio on tablet 106 during a segment of "Kill Bill" where the dialogue includes profanity, such as profanity 114, "Damn Steve, what the hell have you done?" The instruction may contain an instruction to unmute audio that already is being received by the second device during the segment. In this instance, the media guidance application may execute instructions to unmute the audio during the segment, such that the parent hears profanity 114, while the child hears censored profanity 112.

In some embodiments, the media guidance application retrieves, from the first data structure, a plurality of segments containing inappropriate content. For example, the media guidance application may determine five segments in the media asset containing inappropriate content (e.g., profanity 114). The media guidance application may make this determination subsequent to selection of the media asset by the user. The media guidance application generates the enable instruction for each of the plurality of segments. For example, the media guidance application generates an enable instruction for each segment of the five segments containing inappropriate content. The instruction may contain an instruction to unmute audio of the media asset during the segment and mute audio once the segment is completed, in the same manner as described above. The media guidance application may generate the instructions prior to selection of "Kill Bill" by the user or subsequent to selection by the user. The media guidance application stores the enable instruction for each of the plurality of segments in an enable instruction list. For example, the media guidance application may generate a single data structure, such as a list, containing enable instructions for each segment containing inappropriate content in the media asset and store (e.g., storage 908), or remotely at a media guidance data source (e.g., media guidance data source 1018) accessible via a communications network (e.g., communications network 1014), as described further in FIGS. 9-10 below. The media guidance application executes the enable instruction list on the second device. For example, the media guidance application executes the enable instruction list on tablet 106 when "Kill Bill" is selected by the user.

In some embodiments, the media guidance application queries the second device for connection information relating to peripheral devices. For example, the media guidance application may execute a database query language script, such as SQL, utilizing the declarative "Select" command to access data in a particular expression in a table (e.g., a peripheral device table for the second device). The media guidance application determines from values accessed whether a peripheral device (e.g., headphones 116) is connected to tablet 106. The media guidance application determines, from the connection information, whether headphones are connected to the second device. For example, the media guidance application may retrieve a string variable "headphones" identifying the type of connection, in addition to information about the operating parameters (such as the transmitting frequency if the connection is wireless). Based on the "headphones" identifier, the media guidance application determines that headphones 116 are connected to the tablet 106. If the media guidance application determines that headphones are not connected to the second device, the media guidance application does not enable the audio portion of the uncensored version of the media asset. For example, the media guidance application may execute an instruction to override the enabling of audio during the segment containing inappropriate content.

The media guidance application, subsequent to enabling audio of the segment, determines a second time code indicating current progress of the media asset being displayed. The second time code used for purposes of comparison with the stored time codes in the first data structure may be the current progress point of the censored version 104 or the uncensored version 110. For example, the media guidance application continuously monitors the current progress in the media asset by determining time codes according to the process outlined above for determining the first time code. At a given point, the media guidance application determines a second time code, which may have a value of (00:33:30: 15).

The media guidance application determines, from the first data structure, whether the second time code is adjacent to or equivalent to an ending point of the segment. The media guidance application determines that the second time code is adjacent to or equivalent to an ending point of the segment in an analogous manner to how the media guidance application determines the first time code is adjacent to or equivalent to the starting point. For example, the media guidance application may determine that, since the value for the ending point stored in the first data structure is (00:33: 30:15) and the value of the second time code is also (00:33:30:15), that the second time code is equivalent to the ending point.

The media guidance application, upon determining that the second time code is adjacent to or equivalent to the ending point of the segment, disables audio of the segment in the media asset including the inappropriate content. For example, the segment containing profanity 114 may have concluded (i.e., the dialogue is identical again between censored version 104 and uncensored version 110). For example, the media guidance application may cease enabling the audio portion of "Kill Bill" to the parent's tablet upon determining the second time code is adjacent to or equivalent to the ending point of the segment containing profanity 114. As another example, the media guidance application may mute the audio portion of "Kill Bill" enabled on the tablet upon determining the second time code is adjacent to or equivalent to the ending point of the segment containing profanity 114.

In some embodiments, the media guidance application presents the user with a selectable option to override the disabling of the uncensored audio. For example, the media guidance application generates for display a graphic indicating that the parent can override the disabling of audio and enable the audio during scenes where the uncensored version 110 and censored version 104 of "Kill Bill" may not differ. The media guidance application receives a user selection of the option to override the disabling. For example, the parent, via a user input interface (e.g., via user input interface 910 described further below in FIG. 9), selects the option to override the disabling of the uncensored audio. The media guidance application, in response to receiving a selection of the option to override the disabling of the uncensored audio, enables the uncensored audio on the tablet 106.

Figure 2:
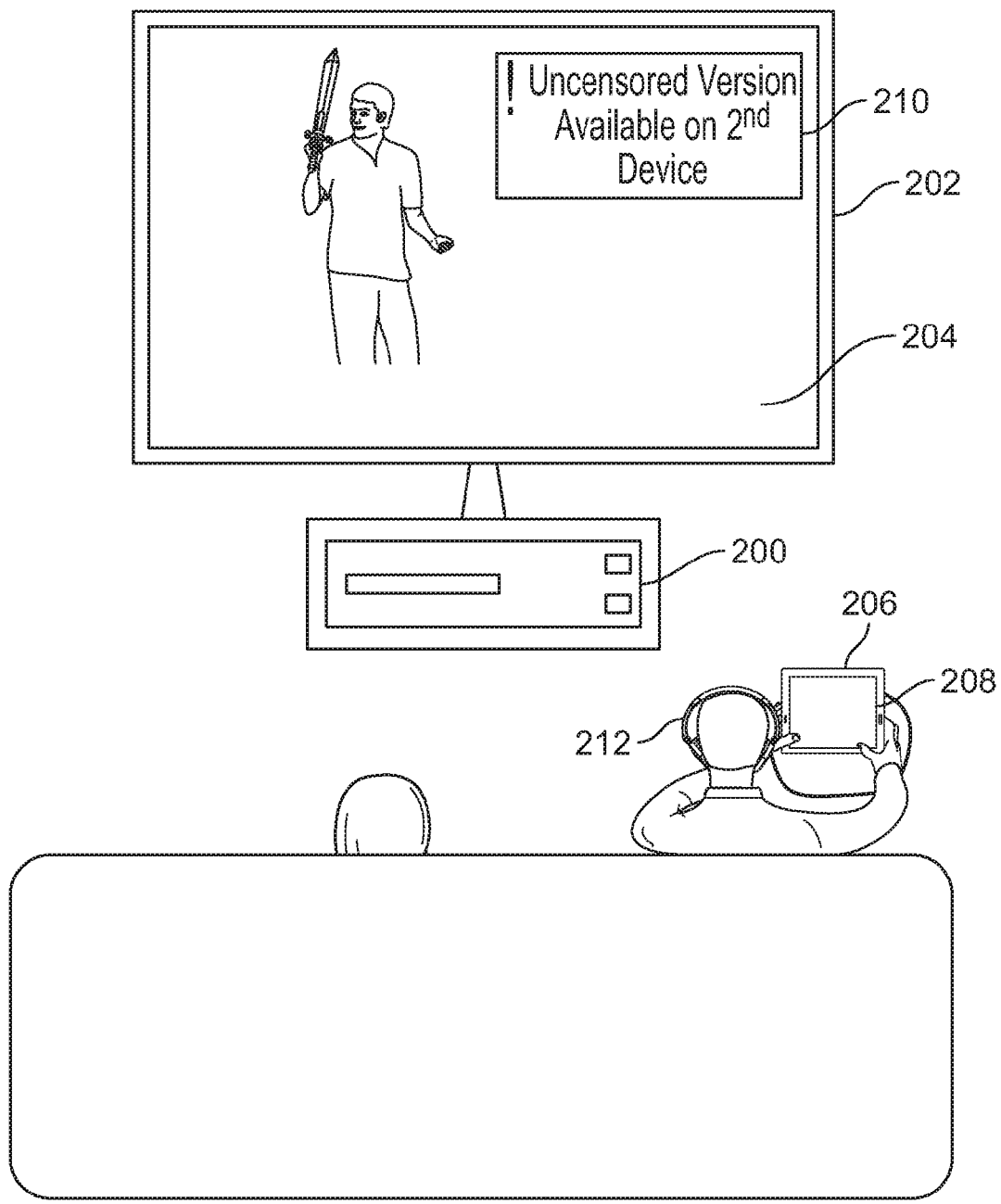
FIG. 2 shows another illustrative example of user equipment devices displaying a media asset in accordance with some embodiments of the disclosure.

FIG. 2 shows another illustrative example of user equipment devices displaying a media asset in accordance with some embodiments of the disclosure. For example, set-top box 200 generates for display on display 202 a media guidance application displaying censored version 204 of the media asset, "Kill Bill." Tablet 206 includes display 208. Display 202 and display 208 may appear on any of the user equipment devices listed in FIGS. 9-10 below. Moreover, the media guidance application may use one or more of the processes described in FIGS. 11-20 below to generate display 202 and 208 or any of the features described therein.

FIG. 2 includes set-top box 200 which generates for display on display 202 censored version 204 of the media asset "Kill Bill." Display 202 may appear on a display device (e.g., user equipment devices 1002, 1004, and/or 1006 (FIG. 10) below). Furthermore, control circuitry 904, as described below in relation to FIG. 9, may be used to generate a display 102. Display 202 includes censored version 204 presented by the media guidance application. FIG. 2 also includes tablet 206 which includes display 208. Display 208 may appear on a display device (e.g., user equipment devices 1002, 1004, and/or 1006 (FIG. 10) below). Furthermore, control circuitry 904, as described below in relation to FIG. 9, may be used to generate a display 208.

In some aspects, a media guidance application generates for display the censored version of the media asset on the first device. The media guidance application may be executed on the first device and a second device simultaneously, or at a location remote from either device (e.g., a remote server), or any suitable combination. For example, the media guidance application requests from a media content source, such as a headend server, the censored version 204 of the movie "Kill Bill." Upon receiving the censored version 204 of "Kill Bill," the media guidance application generates the censored version 204 of "Kill Bill" for display on display 202, which is viewed by a child, whom a parent does not want to see the uncensored version of "Kill Bill," as well as by the parent during segments where the uncensored and censored versions are similar.

The media guidance application determines a first time code indicating current progress of the media asset being displayed. The first time code used for purposes of comparison with the stored time codes in the first data structure may be the current progress point of the censored version 204 or the uncensored version. For example, the media guidance application may determine from a first time code that the current progress point in "Kill Bill" is thirty minutes from the beginning of the movie. The time code may be a numerical representation of the number of frames of the movie presented at a particular point in time. In the example above, the media guidance application may retrieve the time code (00:30:00:00) corresponding to (hour:minute:second:frame).

In some embodiments, the media guidance application retrieves from a time code signal in the media asset, a set of binary coded decimal values referring to a present playback position in the media asset. For example, the media guidance application may determine that a particular signal or header in a data packet contains binary coded decimal values and retrieve those values. The media guidance application converts each binary coded decimal value to a corresponding decimal value corresponding to the first time code. For example, the media guidance application may determine that four particular bits relating to one value in the time code are "1001," which may correspond to the value "9" in the time code.

The media guidance application accesses, from a database containing a plurality of data structures associated with media assets, a first data structure corresponding to the media asset. For example, the media guidance application may access a database, which may be stored locally in memory (e.g., storage 908), or remotely at a media guidance data source (e.g., media guidance data source 1018) accessible via a communications network (e.g., communications network 1014), as described further in FIGS. 9-10 below. The database may be organized into a variety of tables, each associated with a media asset and where an index table points to the tables associated with media assets contained in the database. Alternatively, the database may be organized where data relating to each media asset is stored in an instance of an object of a media asset information class, as is typical of object-oriented programming languages such as C++.

The media guidance application determines, from the first data structure, whether the first time code is adjacent to or equivalent to a starting point of a segment in the media asset including inappropriate content. For example, the media guidance application may determine that "Kill Bill" is currently at a particular progress point given by the first time code, such as (00:33:10:10). The first time code used for purposes of comparison with the stored time codes in the first data structure may be the current progress point of the censored version 204 or the uncensored version. The media guidance application may determine that because (00:33:10:10) is defined in the first data structure as the beginning of a segment containing profanity, the progress in "Kill Bill" corresponds to a segment containing inappropriate content.

The media guidance application, in response to determining that the first time code is adjacent to or equivalent to the starting point of the segment, generates for display an alert that the segment of the media asset is available for access on the second device. For example, the media guidance application generates for display alert 210, which graphically notifies the parent watching censored version 204 of "Kill Bill" with the child on the television that an uncensored version of the segment is available on the second device, tablet 206. Alert 210 could include text, such as, "Uncensored content is available on you tablet."

The media guidance application, in response to determining that the first time code is adjacent to or equivalent to the starting point of the segment, generates for display the segment of the media asset on the second device. For example, the media guidance application requests from a media content source (e.g., media content source 1016 as described further in FIG. 10), such as a headend server, the uncensored version of the movie, "Kill Bill." The media guidance application then generates for display the segment of the uncensored version on display 208 of tablet 206 accessible by the parent.

In some embodiments, the media guidance application queries the second device for connection information relating to peripheral devices. For example, the media guidance application may execute a database query language script, such as SQL, utilizing the declarative "Select" command to access data in a particular expression in a table (e.g., a peripheral device table for the second device). The media guidance application determines from values accessed whether a peripheral device (e.g., headphones 212) is connected to tablet 206. The media guidance application determines, from the connection information, whether headphones are connected to the second device. For example, the media guidance application may retrieve a string variable "headphones" identifying the type of connection, in addition to information about the operating parameters (such as the transmitting frequency if the connection is wireless). Based on the "headphones" identifier, the media guidance application determines that headphones 212 are connected to the tablet 206. If the media guidance application determines that headphones are not connected to the second device, the media guidance application does not enable the audio portion of the uncensored version of the media asset. For example, the media guidance application may execute an instruction to override the enabling of audio during the segment containing inappropriate content.

In some embodiments, the media guidance application retrieves, from a time code signal in the uncensored version of the media, a first version time code corresponding to an uncensored version playback position. For example, the media guidance application retrieves the first version time code, for example (00:33:30:10), in the manner described previously for determining time codes. The media guidance application concurrently retrieves, from a time code signal in the censored version of the media asset, a second version time code corresponding to a censored version playback position. For example, the media guidance application retrieves the second version time code, for example (00:33:29:10). The media guidance application computes a playback delay between the censored and uncensored versions of the media asset by subtracting the second version time code from the first version time code. For example, the media guidance application subtracts the values in the time codes and determines a playback delay of +1 second. The playback delay could arise because of unequal lengths in the runtime of the uncensored segments versus the censored segments. The media guidance application delays playback of either the censored version or the uncensored version such that the playback delay is minimized. For example, the media guidance application may play the censored version of the media asset at a slightly slower speed (e.g., 0.9× the typical speed) until the one second delay is minimized (e.g., the two versions are perfectly synchronized).

The media guidance application determines a second time code of the media asset being displayed. The second time code used for purposes of comparison with the stored time codes in the first data structure may be the current progress point of the censored version 204 or the uncensored version. For example, the media guidance application continuously monitors the current progress in the media asset by determining time codes according to the process outlined above for determining the first time code. At a given point, the media guidance application determines a second time code, which for example may have a value of (00:33:30:15). The media guidance application determines the second time code is adjacent to or equivalent to the ending point in the same manner as that described above for FIG. 1.

The media guidance application, upon determining that the second time code is adjacent to or equivalent to the ending point, ceases display of the uncensored version of the media asset to the second device. For example, the media guidance application determines that the segment containing the inappropriate content has ended and automatically ceases display of the uncensored version of "Kill Bill" to tablet 206. The media guidance application continues to generate for display censored version 204 on display 202, which the parent and child can watch together on the same screen during segments without inappropriate content, since there is no difference in content between the versions during these segments.

Figure 3:
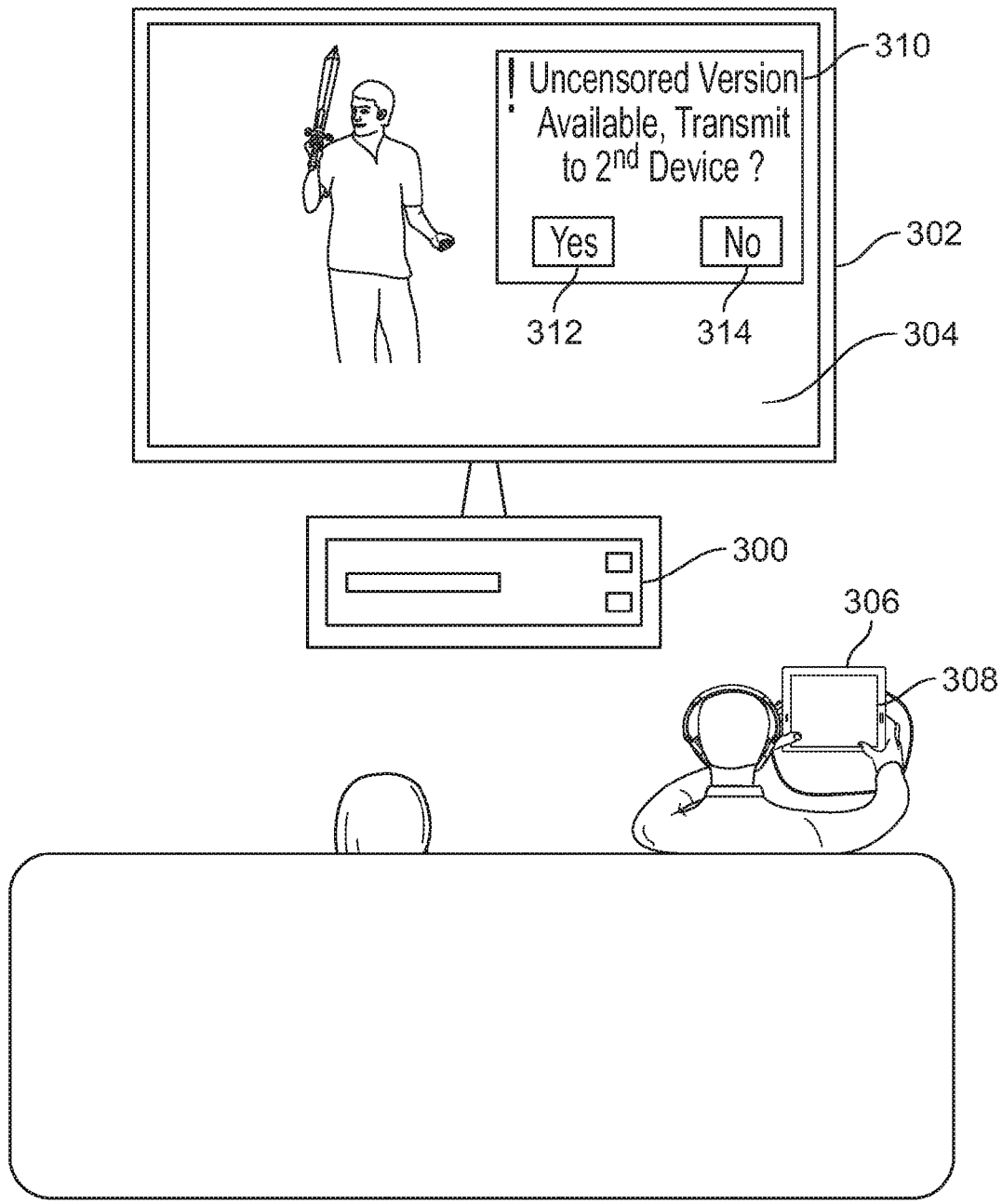
FIG. 3 shows yet another illustrative example of user equipment devices displaying a media asset in accordance with some embodiments of the disclosure.

FIG. 3 shows yet another illustrative example of user equipment devices displaying a media asset in accordance with some embodiments of the disclosure. For example, set-top box 300 generates for display on display 302 a media guidance application displaying censored version 304 of the media asset, "Kill Bill." Tablet 206 includes display 308. Display 302 and display 308 may appear on any of the user equipment devices listed in FIGS. 9-10 below. Moreover, the media guidance application may use one or more of the processes described in FIGS. 11-20 below to generate display 302 and 308 or any of the features described therein.

FIG. 3 includes set-top box 300 which generates for display on display 302 censored version 304 of the media asset "Kill Bill." Display 302 may appear on a display device (e.g., user equipment devices 1002, 1004, and/or 1006 (FIG. 10) below). Furthermore, control circuitry 904, as described below in relation to FIG. 9, may be used to generate a display 302. Display 302 includes censored version 204 presented by the media guidance application. FIG. 3 also includes tablet 306 which includes display 308. Display 308 may appear on a display device (e.g., user equipment devices 1002, 1004, and/or 1006 (FIG. 10) below). Furthermore, control circuitry 904, as described below in relation to FIG. 9, may be used to generate a display 308.

In some embodiments, the media guidance application generates for display on the alert a selectable option to display the uncensored version to the second device. For example, the media guidance application generates for display on alert 310 a selectable button 312 containing text, "Yes, Transmit." The media guidance application may additionally include a selectable option 314 to close the alert 310. The selectable option 314 to close the alert 310 could include text, such as, "No, Close." The media guidance application receives a user selection of the selectable option to generate for display the uncensored version on the second device. For example, the media guidance application receives a selection by the parent, via a user input interface, of selectable button 312 to "Yes, Transmit" the uncensored content. The media guidance application, in response to receiving the user selection, generates for display the uncensored version on the second device. For example, after selection of selectable button 312 to "Yes, Transmit" the uncensored version by the parent, the media guidance application generates for display the uncensored version of the media asset on the parent's tablet 306.

Figure 4:
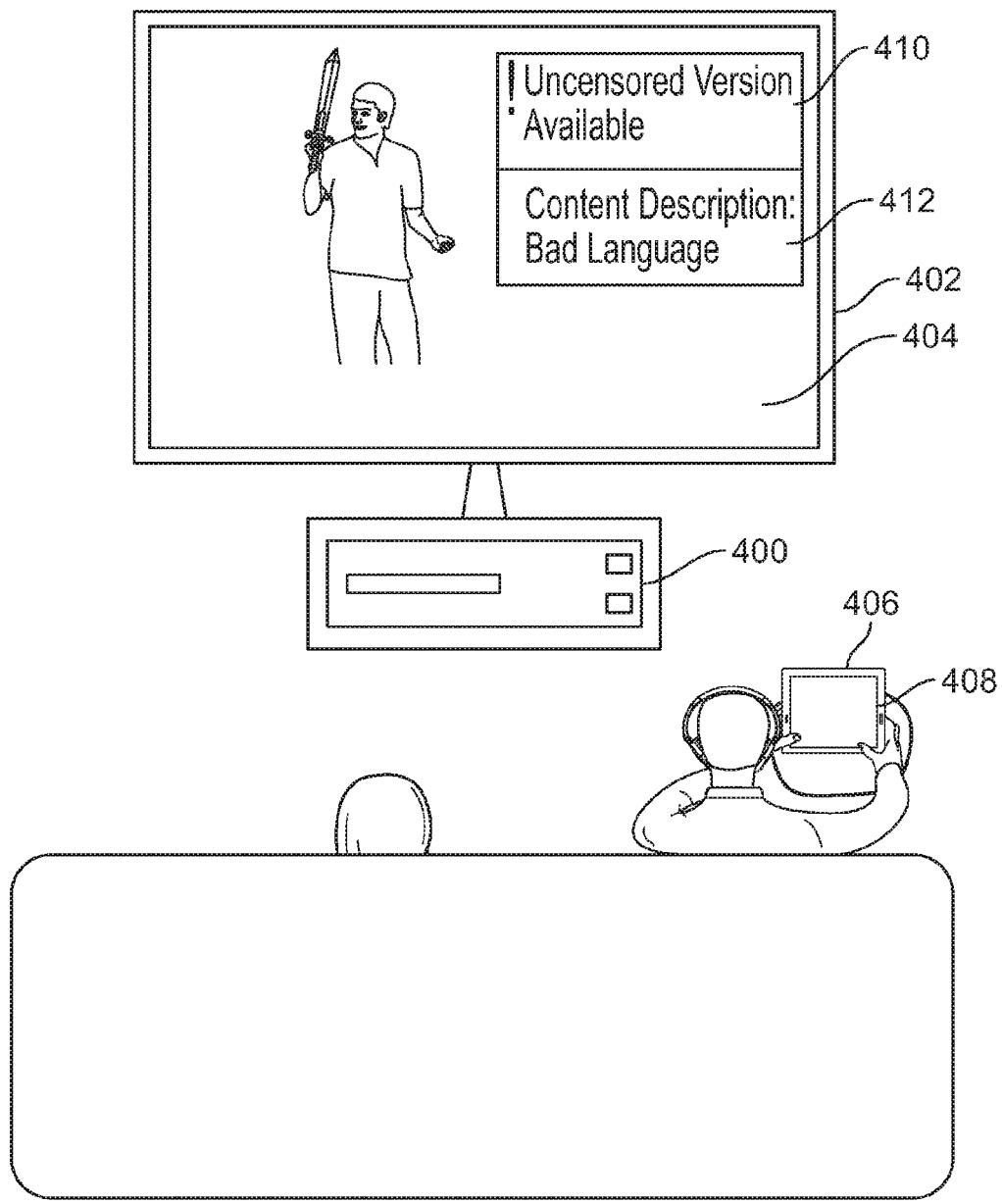
FIG. 4 shows yet another illustrative example of user equipment devices displaying a media asset in accordance with some embodiments of the disclosure.

FIG. 4 shows yet another illustrative example of user equipment devices displaying a media asset in accordance with some embodiments of the disclosure. For example, set-top box 400 generates for display on display 402 a media guidance application displaying censored version 404 of the media asset, "Kill Bill." Tablet 406 includes display 408. Display 402 and display 408 may appear on any of the user equipment devices listed in FIGS. 9-10 below. Moreover, the media guidance application may use one or more of the processes described in FIGS. 11-20 below to generate display 402 and 408 or any of the features described therein.

FIG. 4 includes set-top box 400 which generates for display on display 402 censored version 404 of the media asset "Kill Bill." Display 402 may appear on a display device (e.g., user equipment devices 1002, 1004, and/or 1006 (FIG. 10) below). Furthermore, control circuitry 904, as described below in relation to FIG. 9, may be used to generate a display 402. Display 402 includes censored version 404 presented by the media guidance application. FIG. 4 also includes tablet 406 which includes display 408. Display 408 may appear on a display device (e.g., user equipment devices 1002, 1004, and/or 1006 (FIG. 10) below). Furthermore, control circuitry 904, as described below in relation to FIG. 9, may be used to generate a display 408.

In some embodiments, the media guidance application retrieves, from the first data structure, a content identifier relating to the inappropriate content in the segment. For example, the media guidance application retrieves an identifier of the inappropriate content from a content identifier field by executing a database query language script, such as SQL, for instance utilizing the declarative "Select" command to access data in the particular expression (e.g., the content identifier field). The media guidance application may retrieve a string, such as "Profanity." The media guidance application generates for display on the alert the content identifier. For example, the media guidance application generates for display on alert 410 text 412, "This segment of the uncensored version contains: Profanity," which informs the parent what sort of inappropriate content they will miss by continuing to view the censored version with the child.

Figure 5:
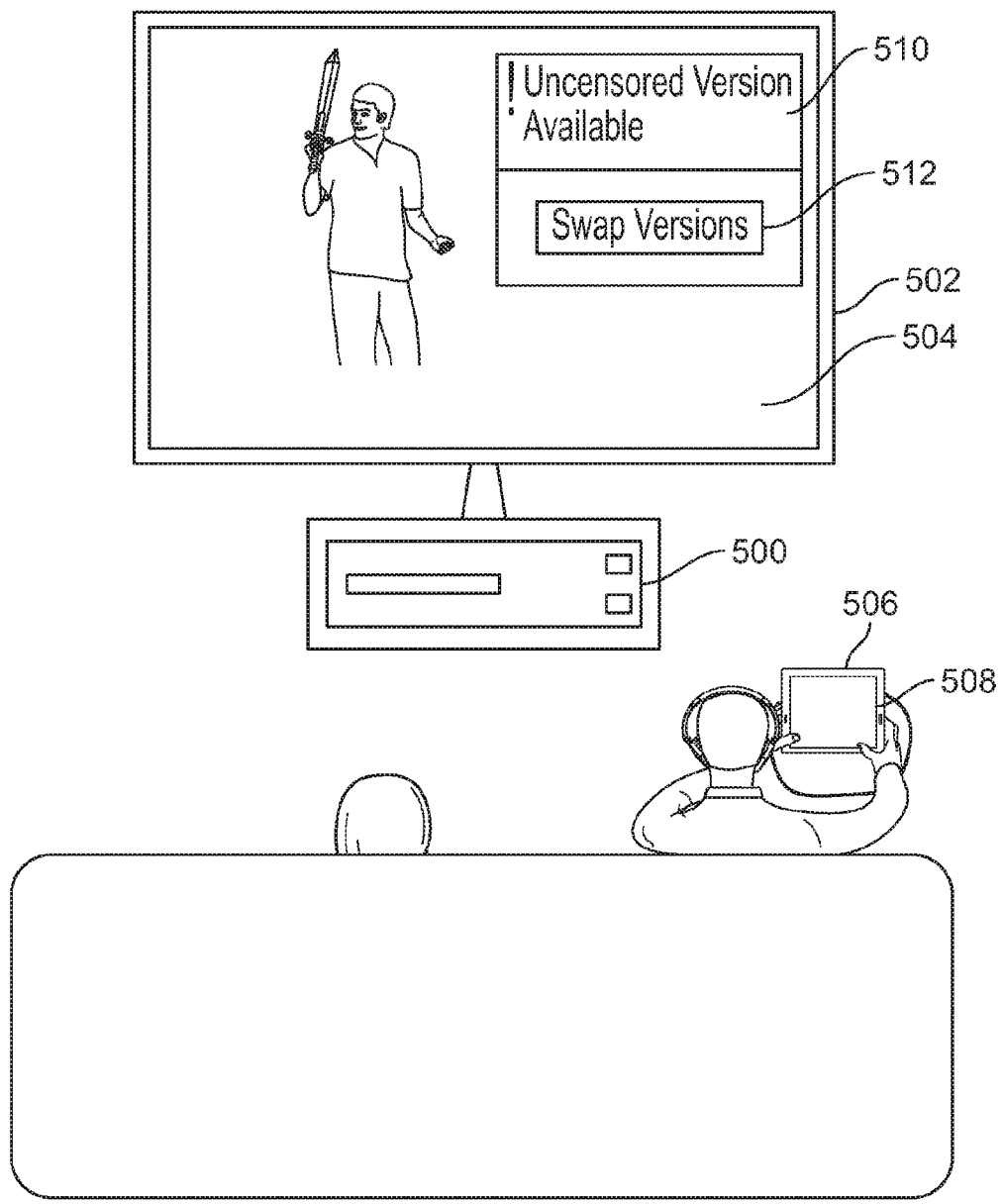
FIG. 5 shows yet another illustrative example of user equipment devices displaying a media asset in accordance with some embodiments of the disclosure.

FIG. 5 shows yet another illustrative example of user equipment devices displaying a media asset in accordance with some embodiments of the disclosure. For example, set-top box 500 generates for display on display 502 a media guidance application displaying censored version 504 of the media asset, "Kill Bill." Tablet 406 includes display 508. Display 502 and display 508 may appear on any of the user equipment devices listed in FIGS. 9-10 below. Moreover, the media guidance application may use one or more of the processes described in FIGS. 11-20 below to generate display 502 and 508 or any of the features described therein.

FIG. 5 includes set-top box 500 which generates for display on display 502 censored version 504 of the media asset "Kill Bill." Display 502 may appear on a display device (e.g., user equipment devices 1002, 1004, and/or 1006 (FIG. 10) below). Furthermore, control circuitry 904, as described below in relation to FIG. 9, may be used to generate a display 502. Display 502 includes censored version 504 presented by the media guidance application. FIG. 5 also includes tablet 506 which includes display 508. Display 508 may appear on a display device (e.g., user equipment devices 1002, 1004, and/or 1006 (FIG. 10) below). Furthermore, control circuitry 904, as described below in relation to FIG. 9, may be used to generate a display 508.

In some embodiments, the media guidance application generates for display a selectable option to display the inappropriate content from the uncensored version on the first device. For example, the media guidance application generates for display with the alert 510 a selectable option 512 including text, "Swap versions." The media guidance application receives a user selection of the selectable option to display the inappropriate content. For example, the media guidance application receives a selection by the parent, via a user input interface, of selectable option 512 to "Swap versions" of "Kill Bill." The media guidance application, in response to receiving the user selection, generates for display the uncensored version on the first device. For example, the media guidance application may generate for display the uncensored version of "Kill Bill" on display 502 instead of censored version 504. The media guidance application may continue to generate for display the uncensored version of the media asset on the second device (e.g., tablet 506). Alternatively, the media guidance application may generate for display the censored version of the media asset on the second device (e.g., tablet 506).

Figure 6:
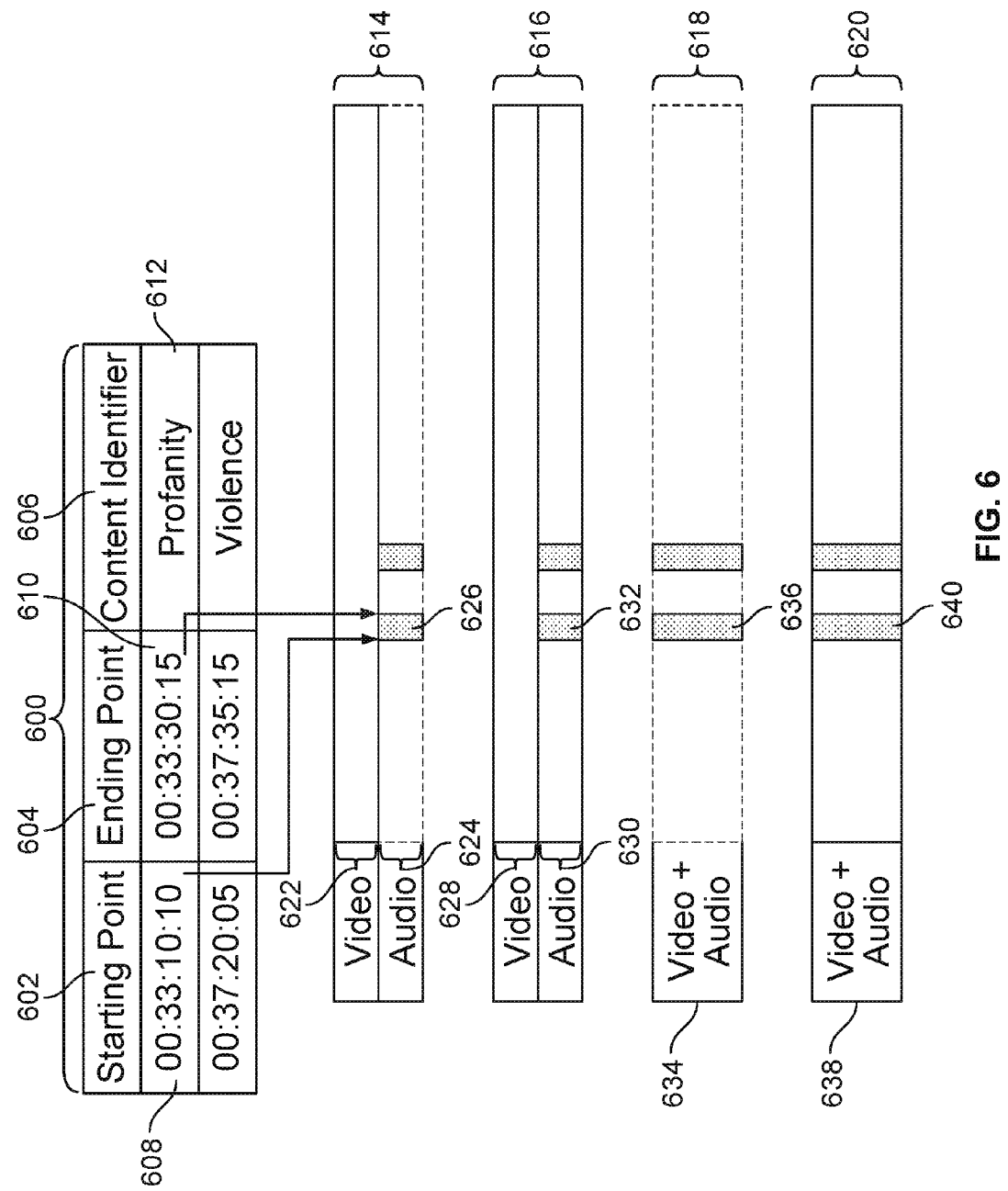
FIG. 6 shows an illustrative depiction of a table containing time codes corresponding to segments containing inappropriate content in accordance with some embodiments of the disclosure.

FIG. 6 shows an illustrative depiction of a table containing time codes corresponding to segments containing inappropriate content in accordance with some embodiments of the disclosure. For example, table 600 may be organized such that each row corresponds to a different segment containing inappropriate content. Table 600 may be stored in memory (e.g., storage as described in FIG. 9) on one or more user devices (e.g., any of the devices listed in FIGS. 9-10 below). Moreover, the media guidance application may use one or more of the processes described in FIGS. 11-20 below to generate table 600 or any of the features described therein.

FIG. 6 includes table 600, which includes information on starting points 602, ending points 604, and content identifiers 606 defining segments containing inappropriate content for a media asset. Table 600 may be stored in memory (e.g., storage as described in FIG. 9) on a user equipment device (e.g., user equipment devices 1002, 1004, and/or 1006 (FIG. 10) below). Furthermore, control circuitry 904, as described below in relation to FIG. 9, may be used to generate table 600 and populate it with values. FIG. 6 also includes illustrative depictions of media assets (e.g., depictions 614, 616, 618, and 620). The illustrative depictions may correspond to received streams of a media asset from a media content source (e.g., media content source 1016 as described further in FIG. 10 below) or buffers already received and stored in memory (e.g., storage as described in FIG. 9) on a user equipment device (e.g., user equipment devices 1002, 1004, and/or 1006 (FIG. 10) below). Furthermore, control circuitry 904, as described below in relation to FIG. 9, may be used to generate for display the media asset associated with illustrative depictions 614, 616, 618, and 620.

In some embodiments, the media guidance application compares the first time code to a plurality of starting points stored in the first data structure. For example, the media guidance application may determine that "Kill Bill" is currently at a particular progress point given by the first time code, such as (00:33:10:10). The media guidance application may retrieve a starting point of a segment from starting points 602 in table 600 corresponding to "Kill Bill."

The media guidance application may retrieve a value of the first starting point from the first data structure. For example, the media guidance application may retrieve an array corresponding to starting point 608 containing four integers, such as 0, 33, 15, and 10 corresponding to hour, minute, second, and frame, as determined from the time code signal in the media asset. The media guidance application may then compute an adjusted first starting point by subtracting a first time offset from the first starting point. For example, if the first time offset is five seconds, then the media guidance application would subtract five seconds from the first starting point (e.g., starting point 608), giving a new set of integers. In the example above, the media guidance application would compute an adjusted first starting point of 0, 33, 10, and 10. The media guidance application then compares the first time code to the adjusted first starting point. For example, the first time code has the values 00:33:10:10, which when subtracted by the media guidance application from the adjusted first starting point, would give a value of zero in all categories. In this example, the media guidance application would determine the first time code is equivalent to the adjusted first starting point.

In some embodiments, the media guidance application presents to the user a plurality of time offset options. For example, the media guidance application presents to the user options such as "10 seconds" or "1 minute," which the user may select in order to enable the audio before the segment containing inappropriate content, such that the user is not caught by surprise by the inappropriate content. The media guidance application receives a user selection of a first time offset option of the plurality of time offset options. For example, the media guidance application may receive a user selection, via a user input interface (e.g., user input interface 910 as described further below in FIG. 9), of the option "10 seconds." The media guidance application stores, in a time offset field of a user profile stored in the database, the time offset option as the first time offset. For example, the media guidance application may store the user selection of "10 seconds" in a user profile corresponding to the user stored in a database of user profiles either locally in memory (e.g., storage 908), or remotely at a media guidance data source (e.g., media guidance data source 1018) accessible via a communications network (e.g., communications network 1014), as described further in FIGS. 9-10 below). The media guidance application, when making the comparison between time codes and starting points, may then retrieve the stored first offset value and calculate the adjusted first starting point.

The media guidance application determines whether the first time code is adjacent to or equivalent to a first starting point of the plurality of starting points. For example, if the first time code determined is (00:13:10:10), the media guidance application may determine that the first time code is not adjacent or equivalent to starting point 608 based on the difference, 20 minutes, being greater than a threshold time difference at which the first time code would be considered adjacent to the starting point. Alternatively, if the first time code determined is (00:33:10:05) and the threshold is 10 frames, the media guidance application may determine that the first time code is adjacent to starting point 608, since they are only five frames apart.

An analogous process may be undertaken to determine whether the second time code is adjacent to or equivalent to an end point stored in table 600. For example, the media guidance application retrieves end point 610 from ending points 604. The media guidance application then compares end point 610 with the second time code and determines whether the time code is adjacent or equivalent to end point 610 in the same manner as described above.

The media guidance application determines whether the first starting point is associated with inappropriate content. For example, the media guidance application may retrieve the contents of inappropriate content field 612 relating to the first starting point (e.g., starting point 608) by executing a database query language script, such as SQL, utilizing the declarative "Select" command to access data in the particular expression (e.g., the inappropriate content field). The media guidance application determines, from the retrieved contents of the inappropriate content field, whether the starting point is associated with inappropriate content. For example, the media guidance application may retrieve a boolean variable set to "true," indicating that the first starting point (e.g., starting point 608) is associated with inappropriate content. As another example, the media guidance application may retrieve any non-null entry from inappropriate content field 612 (e.g., "Profanity") and determine that since the entry is non-null, the segment beginning at starting point 608 contains inappropriate content.

The media guidance application, in response to determining that the first time code is adjacent to or equivalent to the first starting point and is associated with inappropriate content, determines that the first starting point is adjacent to or equivalent to the starting point of the segment containing inappropriate content. For example, the media guidance application may determine that starting point 608 retrieved from table 600, 00:33:10:10, is equivalent to the first time code 00:33:10:10. The media guidance application may also determine that the first starting point is associated with inappropriate content, based on a non-null entry retrieved from inappropriate content field 612 of table 600 corresponding to the media asset. Based on these two determinations, the media guidance application may determine that the first starting point is equivalent to the starting point of the segment containing inappropriate content.

Upon determining the beginning of a segment containing inappropriate content, the media guidance application may present the segment on a second device. In one embodiment, depicted by illustrative depiction 614 of a media asset, the media guidance application generates for display visual component 622 throughout the entirety of the media asset on the second device, but does not enable output of audio 624 except during segments containing inappropriate content (e.g., segment 626). For example, the media guidance application generates for display the uncensored version on the second device during the entirety of the media asset, but enables audio component 624 only during segments defined in table 600 as containing inappropriate content. In this example, the media guidance application does not receive audio component 624 (e.g., from a media content source as described further in FIG. 10) except during segments containing inappropriate content.

In another embodiment, depicted by illustrative depiction 616 of a media asset, the media guidance application generates for display visual component 628 throughout the entirety of the media asset on the second device and enables output of audio component 630, but does not unmute audio component 630 except during segments containing inappropriate content (e.g., segment 632). For example, the media guidance application generates for display the visual component 628 of the uncensored version on the second device during the entirety of the media asset. In contrast with the embodiment above, the media guidance application also receives audio component 630 during the entirety of the media asset (e.g., from a media content source as described further in FIG. 10), but automatically mutes audio component 630 except during segments containing inappropriate content. Thus, the media guidance application may receive a selection by the parent to unmute audio 630 at any time, and subsequently the media guidance application may unmute audio 630 and deliver it to the user.

In another embodiment, depicted by illustrative depiction 618 of a media asset, the media guidance application receives visual and audio components 634 only during segments containing inappropriate content (e.g., segment 636). For example, at points where the media guidance application identifies segments containing inappropriate content (e.g., segment 636) where there is a difference between the censored and uncensored versions of the media asset, the media guidance application generates for display a notification (e.g., as described in FIG. 2-5) on the first device informing the user that an uncensored version of segment 636 is available on the tablet. In this example, the media guidance application does not receive audio and visual components 634 (e.g., from a media content source as described further in FIG. 10) except during segments containing inappropriate content.

In another embodiment, depicted by illustrative depiction 620 of a media asset, the media guidance application receives visual and audio components 638 throughout the entirety of the media asset, but only outputs visual and audio components 638 during segments containing inappropriate content (e.g., segment 640). For example, at points where the media guidance application identifies segments containing inappropriate content (e.g., segment 640) where there is a difference between the censored and uncensored versions of the media asset, the media guidance application generates for display a notification (e.g., as described in FIG. 2-5) on the first device informing the parent that an uncensored version of segment 636 is available on the tablet. In this example, the media guidance application receives audio and visual components 638 throughout the entirety of the media asset (e.g., from a media content source as described further in FIG. 10), in contrast with the above embodiment.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 7:
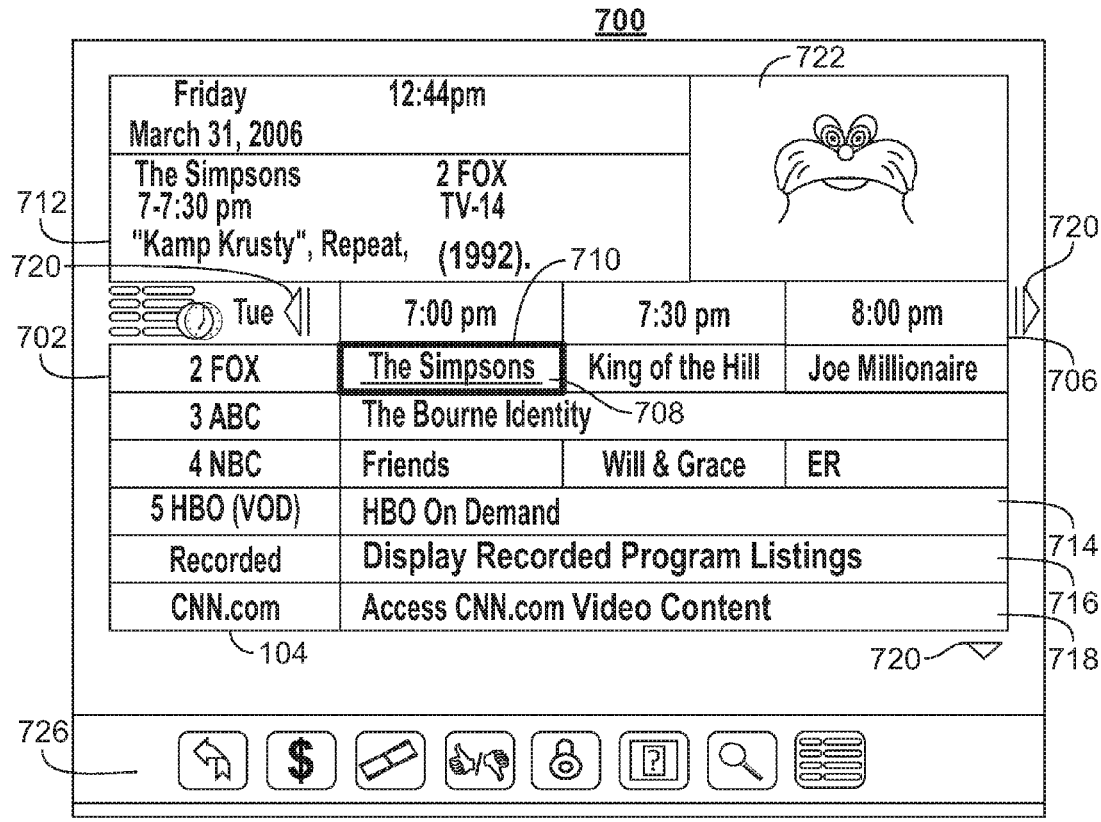
FIG. 7 shows an illustrative example of a display screen for use in accessing media content in accordance with some embodiments of the disclosure.
Figure 8:
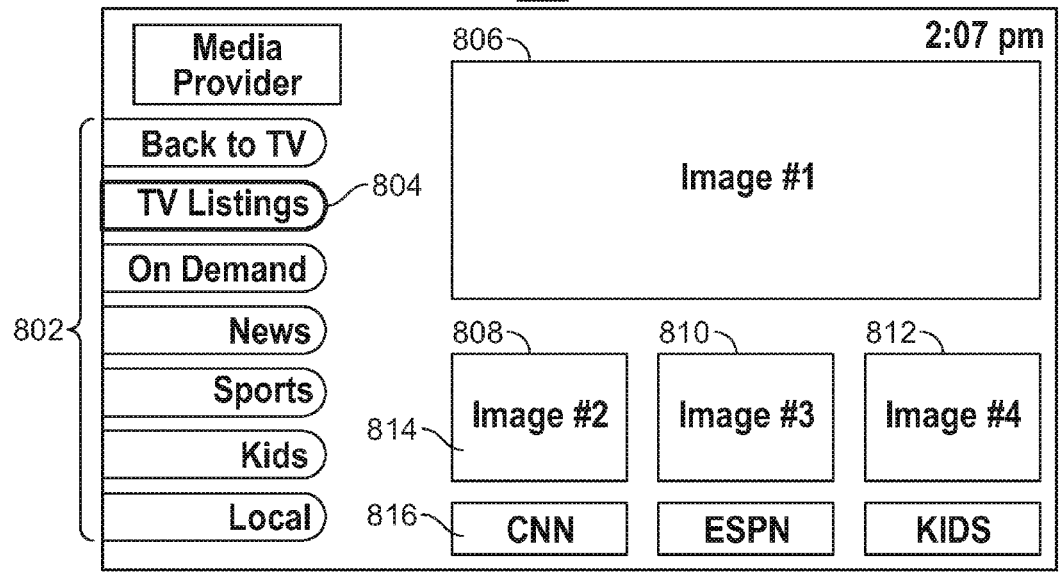
FIG. 8 shows another illustrative example of a display screen used to access media content in accordance with some embodiments of the disclosure.

FIGS. 7-8 show illustrative display screens that may be used to provide media guidance data. The display screens shown in FIGS. 7-8 may be implemented on any suitable user equipment device or platform. While the displays of FIGS. 7-8 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 7 shows illustrative grid of a program listings display 700 arranged by time and channel that also enables access to different types of content in a single display. Display 700 may include grid 702 with: (1) a column of channel/content type identifiers 704, where each channel/content type identifier (which is a cell in the column) identifies a different channel or content type available; and (2) a row of time identifiers 706, where each time identifier (which is a cell in the row) identifies a time block of programming. Grid 702 also includes cells of program listings, such as program listing 708, where each listing provides the title of the program provided on the listings associated channel and time. With a user input device, a user can select program listings by moving highlight region 710. Information relating to the program listing selected by highlight region 710 may be provided in program information region 712. Region 712 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 702 may provide media guidance data for non-linear programming including on-demand listing 714, recorded content listing 716, and Internet content listing 718. A display combining media guidance data for content from different types of content sources is sometimes referred to as a "mixed-media" display. Various permutations of the types of media guidance data that may be displayed that are different than display 700 may be based on user selection or guidance application definition (e.g., a display of only recorded and broadcast listings, only on-demand and broadcast listings, etc.). As illustrated, listings 714, 716, and 718 are shown as spanning the entire time block displayed in grid 702 to indicate that selection of these listings may provide access to a display dedicated to on-demand listings, recorded listings, or Internet listings, respectively. In some embodiments, listings for these content types may be included directly in grid 702. Additional media guidance data may be displayed in response to the user selecting one of the navigational icons 720. (Pressing an arrow key on a user input device may affect the display in a similar manner as selecting navigational icons 720.)

Display 700 may also include video region 722, and options region 726. Video region 722 may allow the user to view and/or preview programs that are currently available, will be available, or were available to the user. The content of video region 722 may correspond to, or be independent from, one of the listings displayed in grid 702. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 726 may allow the user to access different types of content, media guidance application displays, and/or media guidance application features. Options region 726 may be part of display 700 (and other display screens described herein), or may be invoked by a user by selecting an on-screen option or pressing a dedicated or assignable button on a user input device. The selectable options within options region 726 may concern features related to program listings in grid 702 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 10. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 8. Video mosaic display 800 includes selectable options 802 for content information organized based on content type, genre, and/or other organization criteria. In display 800, television listings option 804 is selected, thus providing listings 806, 808, 810, and 812 as broadcast program listings. In display 800 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 808 may include more than one portion, including media portion 814 and text portion 816. Media portion 814 and/or text portion 816 may be selectable to view content in full-screen or to view information related to the content displayed in media portion 814 (e.g., to view listings for the channel that the video is displayed on).

The listings in display 800 are of different sizes (i.e., listing 806 is larger than listings 808, 810, and 812), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 9:
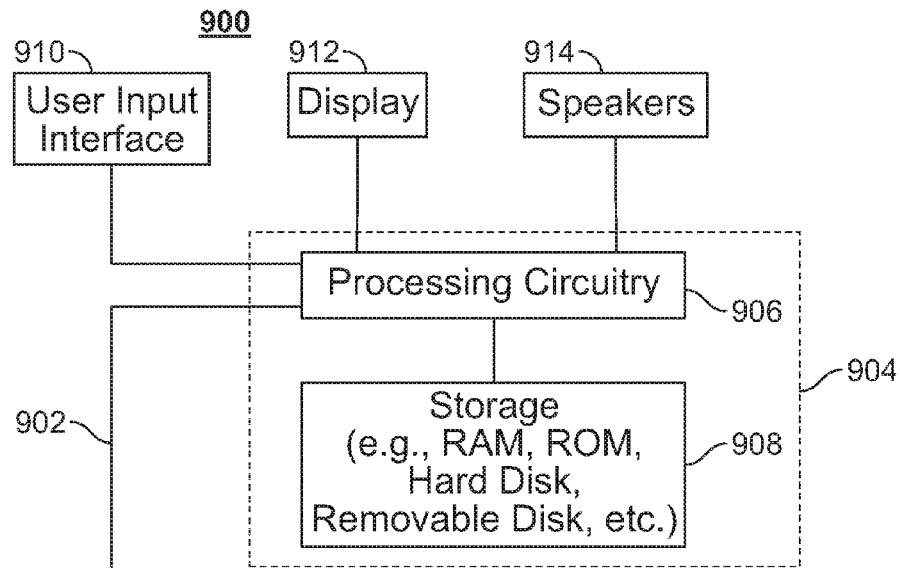
FIG. 9 is a block diagram of an illustrative user equipment device in accordance with some embodiments of the disclosure.

Users may access content and the media guidance application (and its display screens described above and below) from one or more of their user equipment devices. FIG. 9 shows a generalized embodiment of illustrative user equipment device 900. More specific implementations of user equipment devices are discussed below in connection with FIG. 10. User equipment device 900 may receive content and data via input/output (hereinafter "I/O") path 902. I/O path 902 may provide content (e.g., broadcast programming, on-demand programming, Internet content, content available over a local area network (LAN) or wide area network (WAN), and/or other content) and data to control circuitry 904, which includes processing circuitry 906 and storage 908. Control circuitry 904 may be used to send and receive commands, requests, and other suitable data using I/O path 902. I/O path 902 may connect control circuitry 904 (and specifically processing circuitry 906) to one or more communications paths (described below). I/O functions may be provided by one or more of these communications paths, but are shown as a single path in FIG. 9 to avoid overcomplicating the drawing.

Control circuitry 904 may be based on any suitable processing circuitry such as processing circuitry 906. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for a media guidance application stored in memory (i.e., storage 908). Specifically, control circuitry 904 may be instructed by the media guidance application to perform the functions discussed above and below. For example, the media guidance application may provide instructions to control circuitry 904 to generate the media guidance displays. In some implementations, any action performed by control circuitry 904 may be based on instructions received from the media guidance application.

In client-server based embodiments, control circuitry 904 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 10). In addition, communications circuitry may include circuitry that enables peer-to-peer communication of user equipment devices, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media guidance data described above. Nonvolatile memory may also be used (e.g., to launch a boot-up routine and other instructions). Cloud-based storage, described in relation to FIG. 10, may be used to supplement storage 908 or instead of storage 908.

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and downconverting content into the preferred output format of the user equipment 900. Circuitry 904 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment 900, the tuning and encoding circuitry (including multiple tuners) may be associated with storage 908.

A user may send instructions to control circuitry 904 using user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of user equipment device 900. For example, display 912 may be a touchscreen or touch-sensitive display. In such circumstances, user input interface 910 may be integrated with or combined with display 912. Display 912 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 912 may be HDTV-capable. In some embodiments, display 912 may be a 3D display, and the interactive media guidance application and any suitable content may be displayed in 3D. A video card or graphics card may generate the output to the display 912. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 904. The video card may be integrated with the control circuitry 904. Speakers 914 may be provided as integrated with other elements of user equipment device 900 or may be stand-alone units. The audio component of videos and other content displayed on display 912 may be played through speakers 914. In some embodiments, the audio may be distributed to a receiver (not shown), which processes and outputs the audio via speakers 914.

The guidance application may be implemented using any suitable architecture. For example, it may be a stand-alone application wholly-implemented on user equipment device 900. In such an approach, instructions of the application are stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to generate any of the displays discussed herein. Based on the processed instructions, control circuitry 904 may determine what action to perform when input is received from input interface 910. For example, movement of a cursor on a display up/down may be indicated by the processed instructions when input interface 910 indicates that an up/down button was selected.

In some embodiments, the media guidance application is a client-server based application. Data for use by a thick or thin client implemented on user equipment device 900 is retrieved on-demand by issuing requests to a server remote to the user equipment device 900. In one example of a client-server based guidance application, control circuitry 904 runs a web browser that interprets web pages provided by a remote server. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on equipment device 900. This way, the processing of the instructions is performed remotely by the server while the resulting displays are provided locally on equipment device 900. Equipment device 900 may receive inputs from the user via input interface 910 and transmit those inputs to the remote server for processing and generating the corresponding displays. For example, equipment device 900 may transmit a communication to the remote server indicating that an up/down button was selected via input interface 910. The remote server may process instructions in accordance with that input and generate a display of the application corresponding to the input (e.g., a display that moves a cursor up/down). The generated display is then transmitted to equipment device 900 for presentation to the user.

In some embodiments, the media guidance application is downloaded and interpreted or otherwise run by an interpreter or virtual machine (run by control circuitry 904). In some embodiments, the guidance application may be encoded in the ETV Binary Interchange Format (EBIF), received by control circuitry 904 as part of a suitable feed, and interpreted by a user agent running on control circuitry 904. For example, the guidance application may be an EBIF application. In some embodiments, the guidance application may be defined by a series of JAVA-based files that are received and run by a local virtual machine or other suitable middleware executed by control circuitry 904. In some of such embodiments (e.g., those employing MPEG-2 or other digital media encoding schemes), the guidance application may be, for example, encoded and transmitted in an MPEG-2 object carousel with the MPEG audio and video packets of a program.

Figure 10:
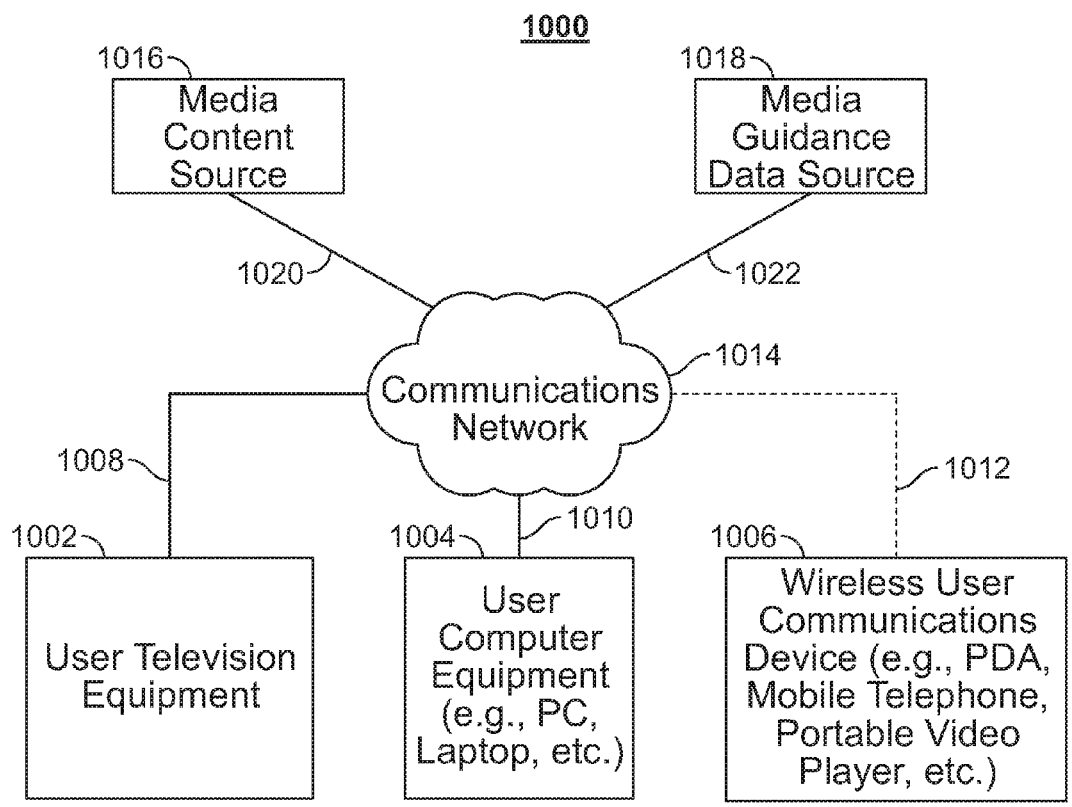
FIG. 10 is a block diagram of an illustrative media system in accordance with some embodiments of the disclosure.

User equipment device 900 of FIG. 9 can be implemented in system 1000 of FIG. 10 as user television equipment 1002, user computer equipment 1004, wireless user communications device 1006, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 9 may not be classified solely as user television equipment 1002, user computer equipment 1004, or a wireless user communications device 1006. For example, user television equipment 1002 may, like some user computer equipment 1004, be Internet-enabled allowing for access to Internet content, while user computer equipment 1004 may, like some television equipment 1002, include a tuner allowing for access to television programming. The media guidance application may have the same layout on various different types of user equipment or may be tailored to the display capabilities of the user equipment. For example, on user computer equipment 1004, the guidance application may be provided as a web site accessed by a web browser. In another example, the guidance application may be scaled down for wireless user communications devices 1006.

In system 1000, there is typically more than one of each type of user equipment device but only one of each is shown in FIG. 10 to avoid overcomplicating the drawing. In addition, each user may utilize more than one type of user equipment device and also more than one of each type of user equipment device.

In some embodiments, a user equipment device (e.g., user television equipment 1002, user computer equipment 1004, wireless user communications device 1006) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1014. Namely, user television equipment 1002, user computer equipment 1004, and wireless user communications device 1006 are coupled to communications network 1014 via communications paths 1008, 1010, and 1012, respectively. Communications network 1014 may be one or more networks including the Internet, a mobile phone network, mobile voice or data network (e.g., a 4G or LTE network), cable network, public switched telephone network, or other types of communications network or combinations of communications networks. Paths 1008, 1010, and 1012 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1012 is drawn with dotted lines to indicate that in the exemplary embodiment shown in FIG. 10 it is a wireless path and paths 1008 and 1010 are drawn as solid lines to indicate they are wired paths (although these paths may be wireless paths, if desired). Communications with the user equipment devices may be provided by one or more of these communications paths, but are shown as a single path in FIG. 10 to avoid overcomplicating the drawing.

Although communications paths are not drawn between user equipment devices, these devices may communicate directly with each other via communication paths, such as those described above in connection with paths 1008, 1010, and 1012, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1014.

System 1000 includes content source 1016 and media guidance data source 1018 coupled to communications network 1014 via communication paths 1020 and 1022, respectively. Paths 1020 and 1022 may include any of the communication paths described above in connection with paths 1008, 1010, and 1012. Communications with the content source 1016 and media guidance data source 1018 may be exchanged over one or more communications paths, but are shown as a single path in FIG. 10 to avoid overcomplicating the drawing. In addition, there may be more than one of each of content source 1016 and media guidance data source 1018, but only one of each is shown in FIG. 10 to avoid overcomplicating the drawing. (The different types of each of these sources are discussed below.) If desired, content source 1016 and media guidance data source 1018 may be integrated as one source device. Although communications between sources 1016 and 1018 with user equipment devices 1002, 1004, and 1006 are shown as through communications network 1014, in some embodiments, sources 1016 and 1018 may communicate directly with user equipment devices 1002, 1004, and 1006 via communication paths (not shown) such as those described above in connection with paths 1008, 1010, and 1012.

Content source 1016 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1016 may be the originator of content (e.g., a television broadcaster, a Webcast provider, etc.) or may not be the originator of content (e.g., an on-demand content provider, an Internet provider of content of broadcast programs for downloading, etc.). Content source 1016 may include cable sources, satellite providers, on-demand providers, Internet providers, over-the-top content providers, or other providers of content. Content source 1016 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1018 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1018 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1018 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1018 may provide user equipment devices 1002, 1004, and 1006 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 908, and executed by control circuitry 904 of a user equipment device 900. In some embodiments, media guidance applications may be client-server applications where only a client application resides on the user equipment device, and server application resides on a remote server. For example, media guidance applications may be implemented partially as a client application on control circuitry 904 of user equipment device 900 and partially on a remote server as a server application (e.g., media guidance data source 1018) running on control circuitry of the remote server. When executed by control circuitry of the remote server (such as media guidance data source 1018), the media guidance application may instruct the control circuitry to generate the guidance application displays and transmit the generated displays to the user equipment devices. The server application may instruct the control circuitry of the media guidance data source 1018 to transmit data for storage on the user equipment. The client application may instruct control circuitry of the receiving user equipment to generate the guidance application displays.

Content and/or media guidance data delivered to user equipment devices 1002, 1004, and 1006 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1000 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 10.

In one approach, user equipment devices may communicate with each other within a home network. User equipment devices can communicate with each other directly via short-range point-to-point communication schemes described above, via indirect paths through a hub or other similar device provided on a home network, or via communications network 1014. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1016 to access content. Specifically, within a home, users of user television equipment 1002 and user computer equipment 1004 may access the media guidance application to navigate among and locate desirable content. Users may also access the media guidance application outside of the home using wireless user communications devices 1006 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1014. These cloud resources may include one or more content sources 1016 and one or more media guidance data sources 1018. In addition or in the alternative, the remote computing sites may include other user equipment devices, such as user television equipment 1002, user computer equipment 1004, and wireless user communications device 1006. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1004 or wireless user communications device 1006 having content capture feature. Alternatively, the user can first transfer the content to a user equipment device, such as user computer equipment 1004. The user equipment device storing the content uploads the content to the cloud using a data transmission service on communications network 1014. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same.

The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 9.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 11:
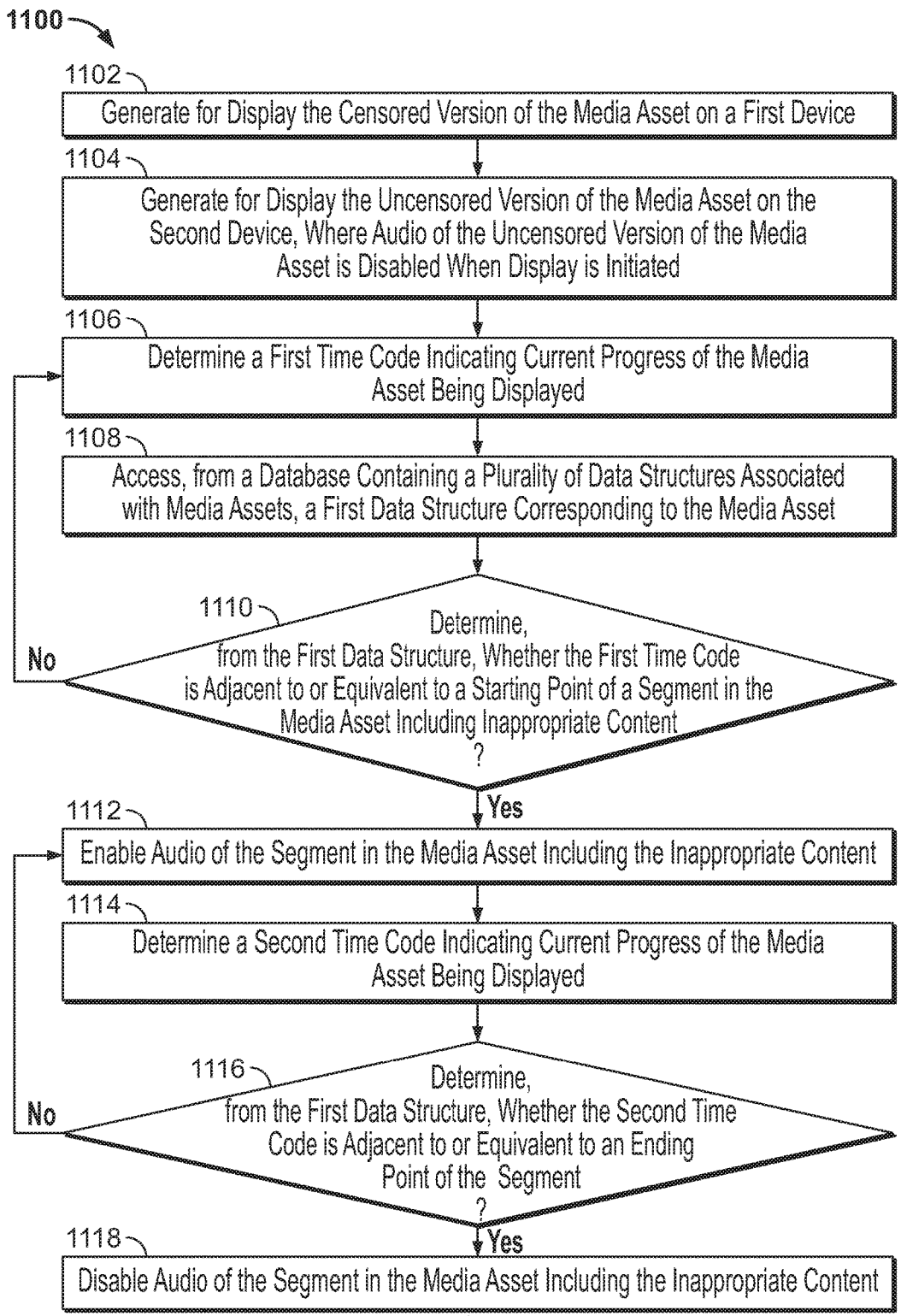
FIG. 11 is a flowchart of illustrative steps for presenting segments of an uncensored version of a media asset on a second device while a censored version of the media asset is generated for display on a first device, in accordance with some embodiments of the disclosure.

FIG. 11 is a flowchart of illustrative steps for presenting segments of an uncensored version of a media asset on a second device while a censored version of the media asset is generated for display on a first device, in accordance with some embodiments of the disclosure. For example, a media guidance application implementing process 1100 may be executed by control circuitry 904 (FIG. 9) to present segments of an uncensored version of a media asset on a second device while a censored version of the media asset is displayed on a first device.

Process 1100 begins at 1102, where control circuitry 904 generates for display the censored version of the media asset on a first device. For example, control circuitry 904 may receive a request by the first user (e.g., via user input interface 910) to view a censored version of a media asset (e.g., censored version 104). Control circuitry 904 then requests from a media content source (e.g., media content source 1016), such as a headend server, the censored version (e.g., censored version 104). Upon receiving the censored version (e.g., censored version 104), control circuitry 904 generates the censored version (e.g., censored version 104) for display on a display (e.g., display 102), which is viewed by a child, whom a parent does not want to see the uncensored version (e.g., uncensored version 110).

Process 1100 proceeds to 1104, where control circuitry 904 generates for display the uncensored version of the media asset on the second device, where audio of the uncensored version of the media asset is disabled when display is initiated. For example, control circuitry 904 requests from a media content source (e.g., media content source 1016 as described below in relation to FIG. 10), such as a headend server, the uncensored version (e.g., uncensored version 110) of the media asset. Upon receiving the uncensored version (e.g., uncensored version 110), control circuitry 904 generates the uncensored version (e.g., uncensored version 110) for display on a display (e.g., display 108).

Process 1100 proceeds to 1106, where control circuitry 904 determines a first time code indicating current progress of the media asset being displayed. For example, control circuitry 904 determines from a first time code that the current progress point in the media asset is thirty minutes from the beginning of the movie. The time code may be a numerical representation of the number of frames of the movie presented at a particular point in time. In the example above, the media guidance application may retrieve the time code (00:30:00:00) corresponding to (hour:minute:second:frame).

Process 1100 proceeds to 1108, where control circuitry 904 accesses, from a database containing a plurality of data structures associated with media assets, a first data structure corresponding to the media asset. For example, control circuitry 904 accesses a database, which may be stored locally in memory (e.g., storage 908), or remotely at a media guidance data source (e.g., media guidance data source 1018) accessible via a communications network (e.g., communications network 1014), as described further in FIGS. 9-10. The database may be organized into a variety of tables, each associated with a media asset and where an index table points to the tables associated with media assets contained in the database, as described further in FIG. 6. Alternatively, the database may be organized where data relating to each media asset is stored in an instance of an object of a media asset information class, as is typical of object-oriented programming languages such as C++.

Process 1100 proceeds to 1110, where control circuitry 904 determines, from the first data structure, whether the first time code is adjacent to or equivalent to a starting point of a segment in the media asset including inappropriate content. For example, if the time code determined is (00:13:10:10), control circuitry 904 may determine that the time code is not adjacent or equivalent to a starting point (e.g., starting point 608) based on the difference, 20 minutes, being greater than a threshold time difference at which the time code would be considered adjacent to the starting point of the segment containing inappropriate content, as described in more detail in FIG. 13 below.

If control circuitry 904 determines the first time code is not adjacent to or equivalent to a starting point of a segment in the media asset including inappropriate content, process 1100 may return to 1106, where control circuitry 904 determines a first time code indicating current progress of the media asset being displayed. For example, control circuitry 904 may continually monitor for segments containing inappropriate content by comparing the progress of the media asset (based on retrieving time codes) with the database defining segments containing inappropriate content.

If control circuitry 904 determines the first time code is adjacent to or equivalent to a starting point of a segment in the media asset including inappropriate content, process 1100 may continue to 1112 where control circuitry 904 enables audio of the segment in the media asset including the inappropriate content. Control circuitry 904 may enable audio in any manner as described above in FIG. 1-6. For example, control circuitry 904 may enable output of audio on the second device during the segment containing inappropriate content. Control circuitry 904 enables output of audio on the second device (e.g., tablet 106) during a segment of the media asset where the dialogue includes profanity (e.g., profanity 114). Alternatively, control circuitry 904 may enable output of the audio already, but with an instruction to mute the audio at the second device. In this instance, control circuitry 904 may execute instructions to unmute the audio during the segment, such that the parent hears the uncensored audio (e.g., profanity 114), while the child hears censored audio (e.g., censored profanity 112).

Process 1100 may proceed to 1114, where control circuitry 904 determines a second time code indicating current progress of the media asset being displayed. For example, control circuitry 904 continuously monitors the current progress in the media asset by determining time codes according to the process outlined above for determining the first time code. At a given point, control circuitry 904 determines a second time code, which may have a value of (00:33:30:15).

Process 1100 may proceed to 1116, where control circuitry 904 determines, from the first data structure, whether the second time code is adjacent to or equivalent to an ending point of the segment. For example, control circuitry 904 determines that the second time code is adjacent to or equivalent to an ending point (e.g., ending point 610) of the segment in an analogous manner to how control circuitry 904 determines the first time code is adjacent to or equivalent to the starting point. For example, control circuitry 904 may determine that, since the value for the ending point stored in the first data structure is (00:33:30:15) and the value of the second time code is also (00:33:30:15), that the second time code is equivalent to the ending point. If control circuitry 904 determines the second time code is not adjacent to or equivalent to an ending point of the segment, process 1100 may return to 1112, where control circuitry 904 enables audio of the segment in the media asset including the inappropriate content. For example, control circuitry 904 continues to enable audio of the segment containing inappropriate content on the second device until the second time code matches the ending point of the segment (e.g., ending point 610).

If control circuitry 904 determines the second time code is adjacent to or equivalent to an ending point of the segment, process 1100 may continue to 1118, where control circuitry 904 disables audio of the segment in the media asset including the inappropriate content.

Figure 12:
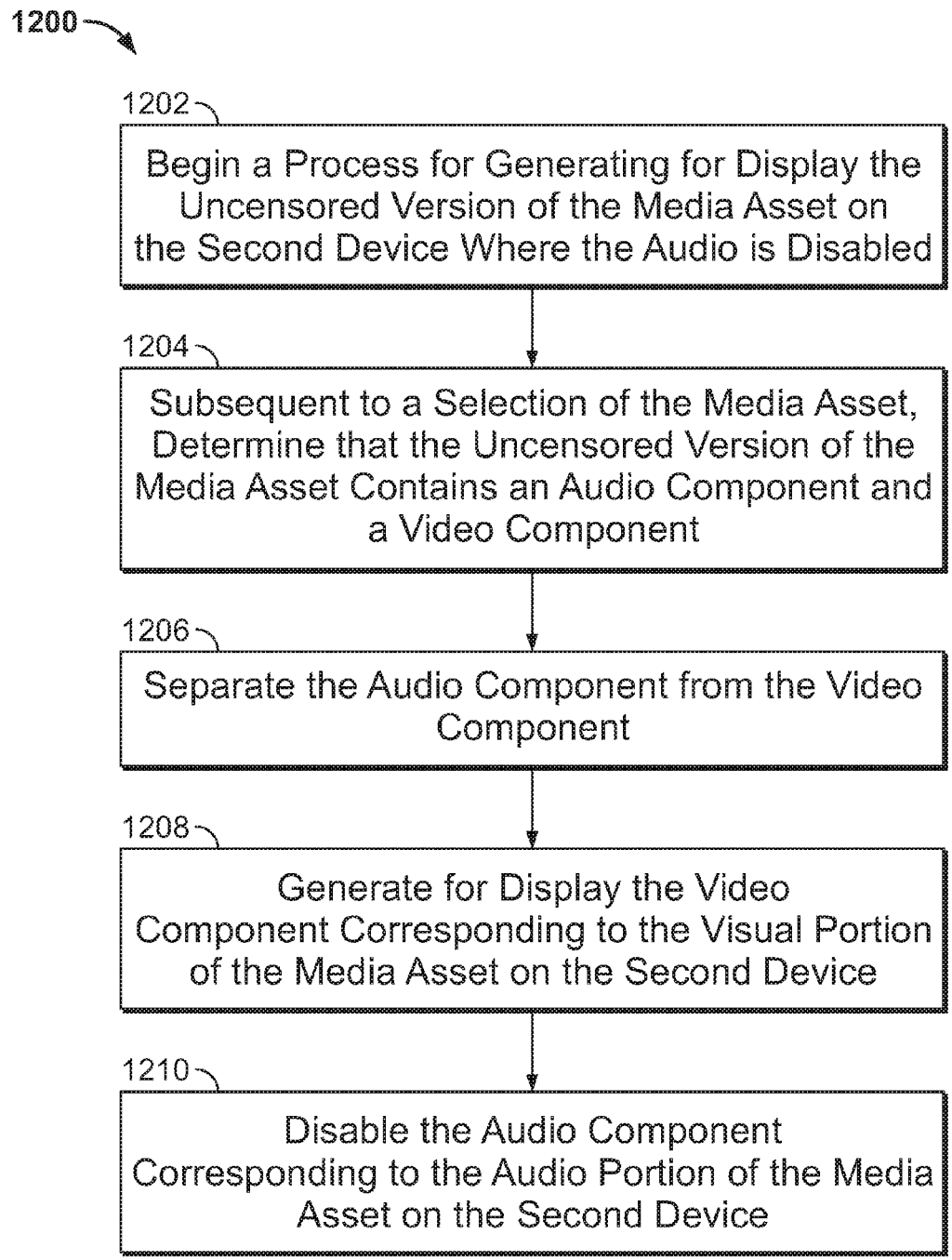
FIG. 12 is a flowchart of illustrative steps for generating for display the uncensored version of the media asset on the second device where the audio is disabled, in accordance with some embodiments of the disclosure.

FIG. 12 is a flowchart of illustrative steps for generating for display the uncensored version of the media asset on the second device where the audio is disabled, in accordance with some embodiments of the disclosure. For example, a media guidance application implementing process 1200 may be executed by control circuitry 904 (FIG. 9).

Process 1200 begins at 1202, where control circuitry 904 begins a process for generating for display the uncensored version of the media asset on the second device where the audio is disabled. For example, control circuitry 904, upon initiating display of the uncensored version (e.g., uncensored version 110) on the display (e.g., display 108), may generate for display the video component of the uncensored version, but may disable the audio, such that the user viewing the second device hears the audio from the first device only and not both devices concurrently.

Process 1200 continues to 1204, where control circuitry 904, subsequent to a selection of the media asset, determines that the uncensored version of the media asset contains an audio component and a video component. For example, the media guidance application generates for display the video component corresponding to the visual portion of the media asset on tablet 106. For example, control circuitry 904 may identify the contents of packets received from a media content source (e.g., media content source 1016 as described further in FIG. 10) based on an identifier in the packets. For packets identified as relating to the visual portion of the media asset, the media guidance application generates for display the visual information contained in the packets on the second device (e.g., tablet 106). Control circuitry 904 prevents output of the audio component corresponding to the audio portion of the media asset on the second device (e.g., tablet 106). For example, control circuitry 904 may identify the contents of packets received from a media content source (e.g., media content source 1016 as described further in FIG. 10) based on an identifier in the packets. For packets identified as relating to audio of the media asset, the media guidance application prevents output of the audio information contained in the packets on the second device (e.g., tablet 106).

Process 1200 proceeds to 1206, where control circuitry 904 separates the audio component from the video component. For example, control circuitry 904, based on the identification of the content of a packet, may separate the packets. Control circuitry 904 may categorize packets as either packets used to generate the information contained therein for display (for packets identified as containing visual information) or packets to not output the information contained therein (for packets identified as containing auditory information). Control circuitry 904 may store the packets containing the audio component of the media asset in storage 908 for later access by the user.

Process 1200 proceeds to 1208, where control circuitry 904 generates for display the video component corresponding to the visual portion of the media asset on the second device. For example, control circuitry 904 may generate for display the information contained in the packets identified as containing visual information relating to the media asset.

Process 1200 proceeds to 1210, where control circuitry 904 disables the audio component corresponding to the audio portion of the media asset on the second device. For example, control circuitry 904 may not output the information contained in the packets identified as containing audio information relating to the media asset.

Figure 13:
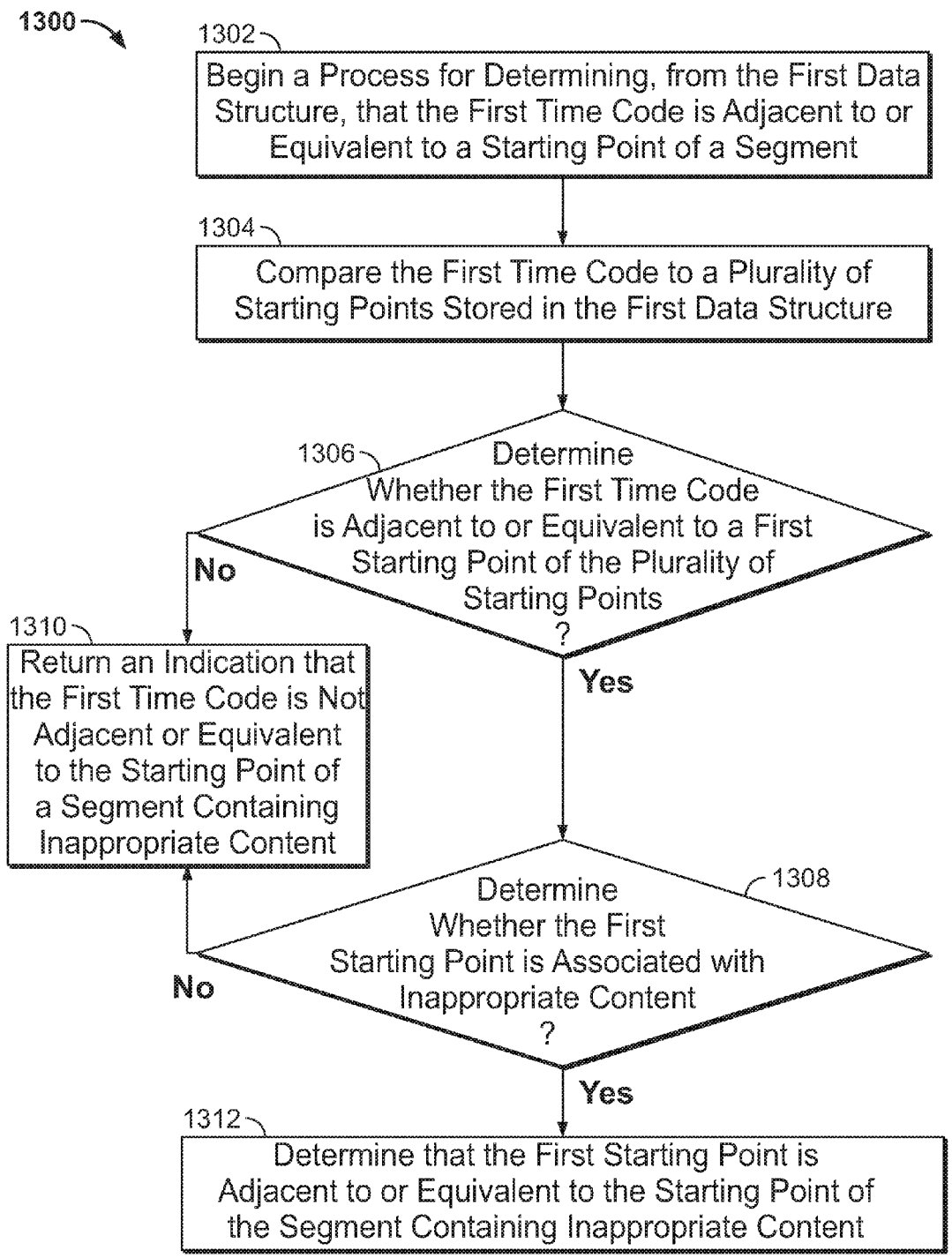
FIG. 13 is a flowchart of illustrative steps for determining, from the first data structure, that the first time code is adjacent to or equivalent to a starting point of a segment, in accordance with some embodiments of the disclosure.

FIG. 13 is a flowchart of illustrative steps for determining, from the first data structure, that the first time code is adjacent to or equivalent to a starting point of a segment, in accordance with some embodiments of the disclosure. For example, a media guidance application implementing process 1300 may be executed by control circuitry 904 (FIG. 9).

Process 1300 begins at 1302, where control circuitry 904 begins a process for determining, from the first data structure, that the first time code is adjacent to or equivalent to a starting point of a segment. For example, if the time code determined is (00:13:10:10), control circuitry 904 may determine that the time code is not adjacent or equivalent to the starting point (e.g., starting point 608) based on the difference, 20 minutes, being greater than a threshold time difference at which the time code would be considered adjacent to the starting point. Alternatively, if the time code determined is (00:33:10:05) and the threshold is 10 frames, control circuitry 904 may determine that the first time code is adjacent to the starting point (e.g., starting point 608), since they are only five frames apart.

Process 1300 continues to 1304, where control circuitry 904 compares the first time code to a plurality of starting points stored in the first data structure. For example, control circuitry 904 may determine that the media asset is currently at a particular progress point given by the first time code, such as (00:33:10:10). The control circuitry 904 may retrieve a starting point of a segment (e.g., from starting points 602 in table 600) corresponding to the media asset.

Process 1300 continues to 1306, where control circuitry 904 determines whether the first time code is adjacent to or equivalent to a first starting point of the plurality of starting points. For example, if the first time code determined is (00:13:10:10), control circuitry 904 may determine that the first time code is not adjacent or equivalent to the starting point (e.g., starting point 608) based on the difference, 20 minutes, being greater than a threshold time difference at which the first time code would be considered adjacent to the starting point. Alternatively, if the first time code determined is (00:33:10:05) and the threshold is 10 frames, the media guidance application may determine that the first time code is adjacent to the starting point (e.g., starting point 608), since they are only five frames apart.

If control circuitry 904 determines the first time code is not adjacent to or equivalent to a first starting point of the plurality of starting points, process 1300 may continue to 1310, where control circuitry 904 returns an indication that the first time code is not adjacent or equivalent to the starting point of a segment containing inappropriate content.

If control circuitry 904 determines the first time code is adjacent to or equivalent to a first starting point of the plurality of starting points, process 1300 may continue to 1308, where control circuitry 904 determines whether the first starting point is associated with inappropriate content. For example, control circuitry 904 may retrieve the contents of an inappropriate content field (e.g., inappropriate content field 612) relating to a starting point (e.g., starting point 608) by executing a database query language script, such as SQL, utilizing the declarative "Select" command to access data in the particular expression (e.g., the inappropriate content field). Control circuitry 904 determines, from the retrieved contents of an inappropriate content field (e.g., inappropriate content field 612), whether the starting point is associated with inappropriate content. For example, control circuitry 904 may retrieve a boolean variable set to "true," indicating that the first starting point (e.g., starting point 608) is associated with inappropriate content. As another example, the media guidance application may retrieve any non-null entry from the inappropriate content field (e.g., inappropriate content field 612) and determine that since the entry is non-null, the segment beginning at the first starting point (e.g., starting point 608) contains inappropriate content.

If control circuitry 904 determines the first starting point is not associated with inappropriate content, process 1300 may continue to 1310, where control circuitry 904 returns an indication that the first time code is not adjacent or equivalent to the starting point of a segment containing inappropriate content.

If control circuitry 904 determines the first starting point is associated with inappropriate content, process 1300 may continue to 1312, where control circuitry 904 determines that the first starting point is adjacent to or equivalent to the starting point of the segment containing inappropriate content.

Figure 14:
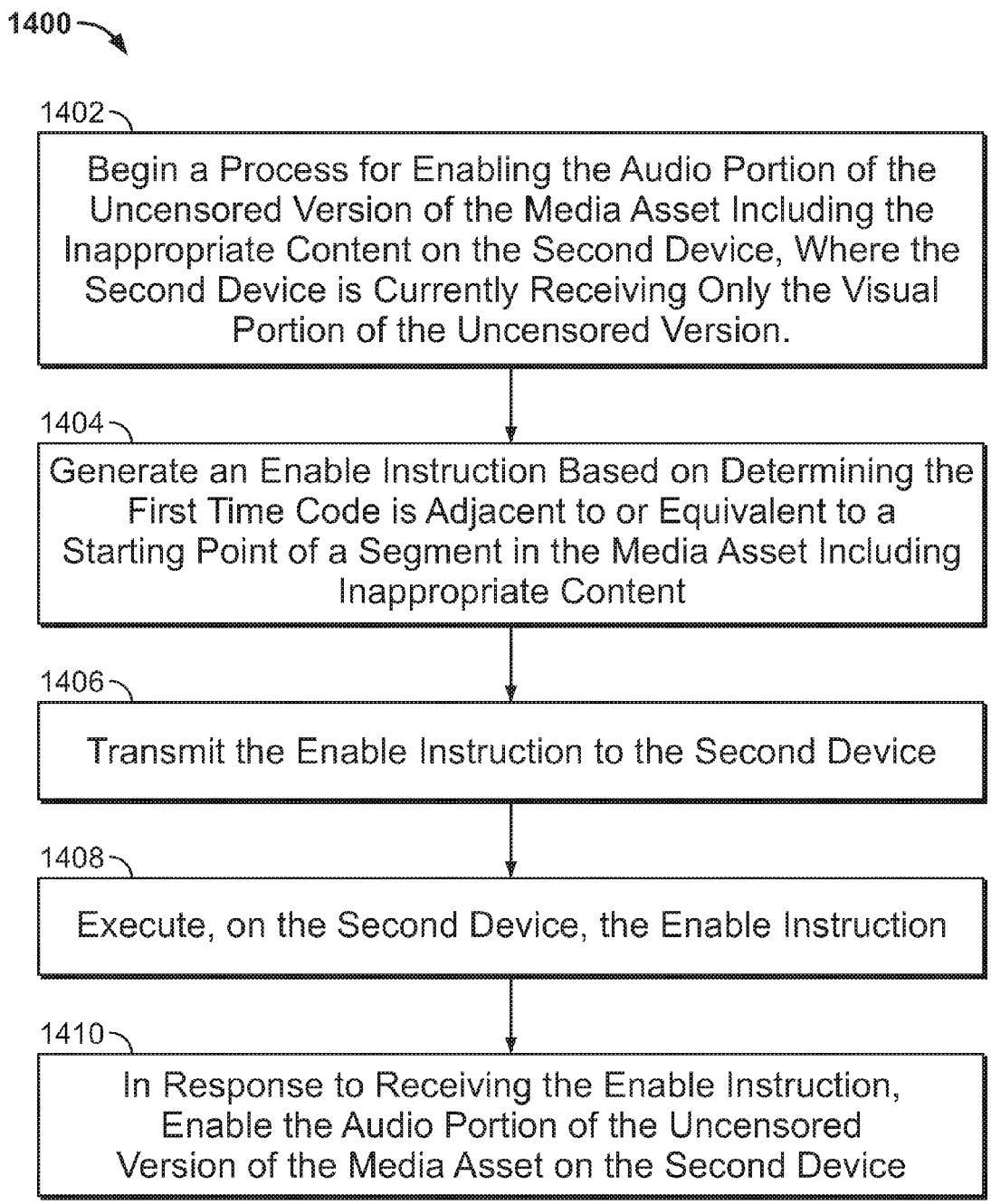
FIG. 14 is a flowchart of illustrative steps for enabling the audio portion of the uncensored version of the media asset including the inappropriate content on the second device, in accordance with some embodiments of the disclosure.

FIG. 14 is a flowchart of illustrative steps for enabling the audio portion of the uncensored version of the media asset including the inappropriate content on the second device, in accordance with some embodiments of the disclosure. For example, a media guidance application implementing process 1400 may be executed by control circuitry 904 (FIG. 9).

Process 1400 begins at 1402, where control circuitry 904 begins a process for enabling the audio portion of the uncensored version of the media asset including the inappropriate content on the second device, where the second device is currently receiving only the visual portion of the uncensored version.

Process 1400 continues to 1404, where control circuitry 904 generates an enable instruction based on determining the first time code is adjacent to or equivalent to a starting point of a segment in the media asset including inappropriate content. For example, control circuitry 904 generates an instruction to enable the audio during the segment subsequent to determining the segment contains inappropriate content (e.g., profanity 114) and the first time code matches the starting point of the segment. Control circuitry 904 may generate an executable script containing commands to enable the audio (e.g., unmute the audio) during the segment.

Process 1400 continues to 1406, where control circuitry 904 transmits the enable instruction to the second device. For example, control circuitry 904 may generate the executable script on a device or location different from the second device. In this example, control circuitry 904 transmits the instructions to the second device. In the case where the instruction is generated by control circuitry 904 on the second device, the transmission may not be necessary.

Process 1400 continues to 1408, where control circuitry 904 executes, on the second device, the enable instruction. For example, control circuitry 904 executes the enable instruction that enables audio during the segment. Process 1400 continues to 1410, where control circuitry 904, in response to receiving the enable instruction, enables the audio portion of the uncensored version of the media asset on the second device. For example, control circuitry 904 enables output of audio on the second device (e.g., tablet 106) during a segment of the media asset where the dialogue includes profanity (e.g., profanity 114). The instruction may contain an instruction to unmute audio that already is being received by the second device during the segment. In this instance, control circuitry 904 may execute instructions to unmute the audio during the segment, such that one user hears the uncensored audio (e.g., profanity 114), while the other user hears censored audio (e.g., censored profanity 112).

Figure 15:
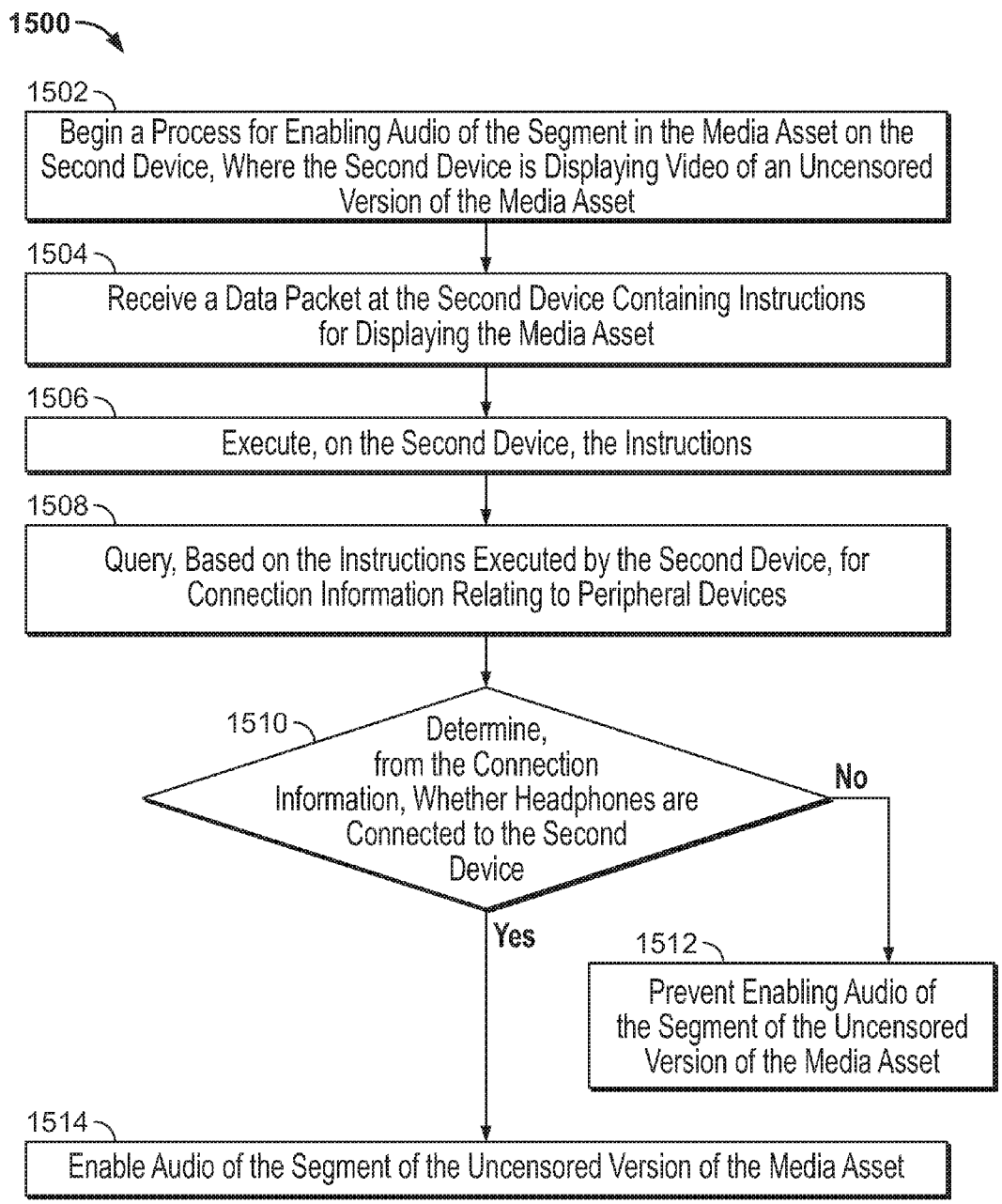
FIG. 15 is a flowchart of illustrative steps for enabling audio of the segment in the media asset on the second device, in accordance with some embodiments of the disclosure.

FIG. 15 is a flowchart of illustrative steps for enabling audio of the segment in the media asset on the second device, in accordance with some embodiments of the disclosure. For example, a media guidance application implementing process 1500 may be executed by control circuitry 904 (FIG. 9).

Process 1500 begins at 1502, where control circuitry 904 begins a process for enabling audio of the segment in the media asset on the second device, where the second device is displaying video of an uncensored version of the media asset.

Process 1500 continues to 1504 where control circuitry 904 receives a data packet at the second device containing instructions for displaying the media asset. For example, control circuitry 904 on the second device may receive the data packet containing instructions via communications network 1014. Alternatively, control circuitry 904 may not need to receive the instructions if they are generated by the second device.

Process 1500 continues to 1506, where control circuitry 904 executes, on the second device, the instructions. For example, control circuitry 904 may execute a database query language script, such as SQL, utilizing the declarative "Select" command to access data in a particular expression in a table (e.g., a peripheral device table for the second device).

Process 1500 continues to 1508, where control circuitry 904 queries, based on the instructions executed by the second device, for connection information relating to peripheral devices. For example, the media guidance application determines from values retrieved from the table by the SQL script, whether a peripheral device (e.g., headphones 116) is connected to the second device (e.g., tablet 106).

Process 1500 continues to 1510, where control circuitry 904 determines, from the connection information, whether headphones are connected to the second device. For example, control circuitry 904 may retrieve a string variable "headphones" identifying the type of connection, in addition to information about the operating parameters (such as the transmitting frequency if the connection is wireless). Based on the "headphones" identifier, control circuitry 904 determines that headphones (e.g., headphones 116) are connected to the second device (e.g., tablet 106). If control circuitry 904 determines that headphones are connected to the second device, process 1500 proceeds to 1514, where control circuitry 904 enables audio of the segment of the uncensored version of the media asset.

If control circuitry 904 determines that headphones are not connected to the second device, control circuitry 904 does not enable the audio portion of the uncensored version of the media asset. For example, control circuitry 904 may execute an instruction to override the enabling of audio during the segment containing inappropriate content.

Figure 16:
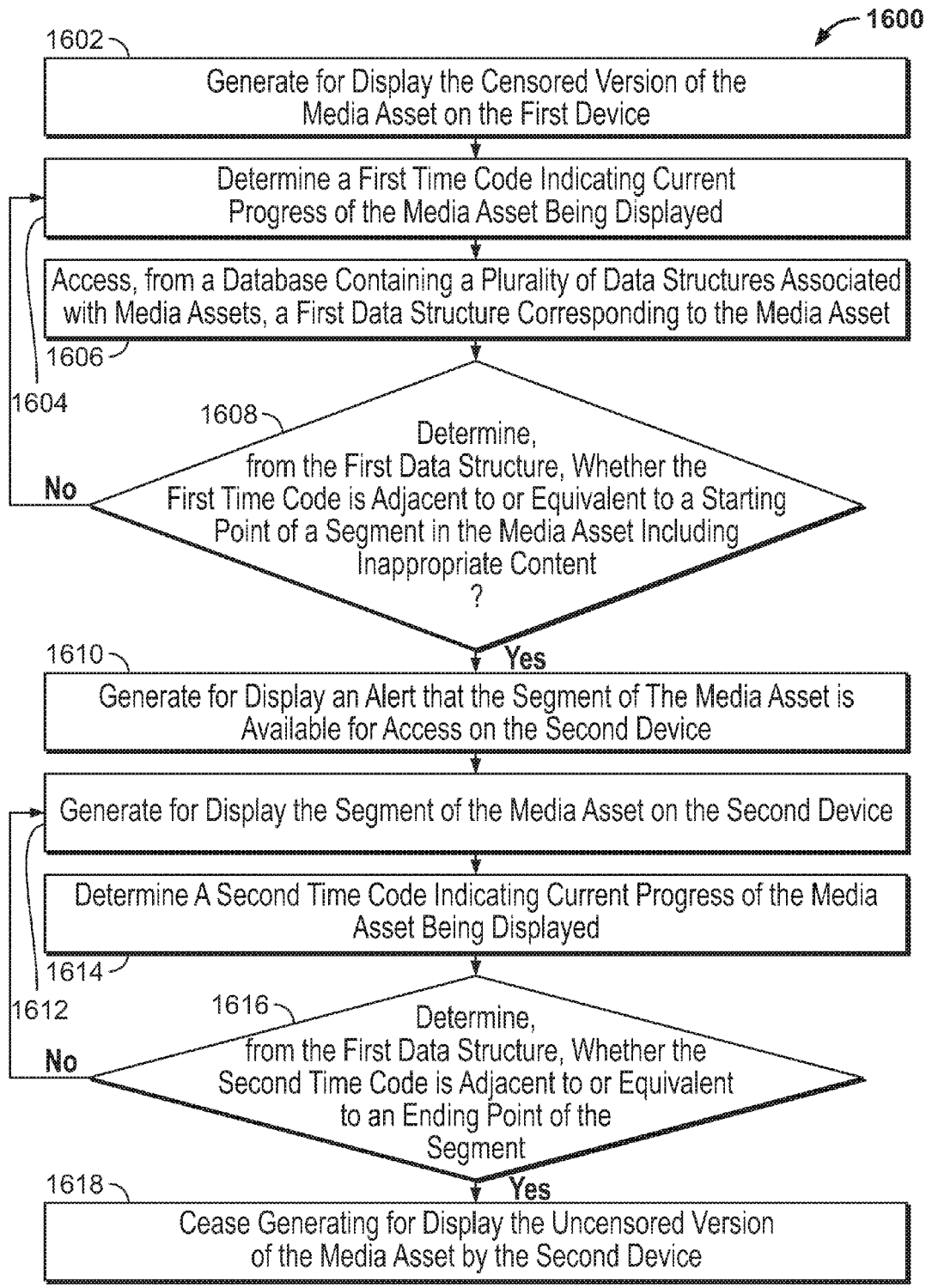
FIG. 16 is a flowchart of illustrative steps for enabling audio of the segment in the media asset on the second device, in accordance with some embodiments of the disclosure.

FIG. 16 is a flowchart of illustrative steps for enabling audio of the segment in the media asset on the second device, in accordance with some embodiments of the disclosure. For example, a media guidance application implementing process 1600 may be executed by control circuitry 904 (FIG. 9).

Process 1600 begins at 1602, where control circuitry 904 generates for display the censored version of the media asset on the first device. For example, control circuitry 904 requests from a media content source (e.g., media content source 1016), such as a headend server, the censored version (e.g., censored version 204) of the media asset. Upon receiving the censored version (e.g., censored version 204), control circuitry 904 generates the censored version (e.g., censored version 204) of the media asset for display (e.g., on display 202), which is viewed by a child, whom a parent does not want to see the uncensored version of "Kill Bill," as well as by the parent during segments where the uncensored and censored versions are similar.

Process 1600 continues to 1604, where control circuitry 904 determines a first time code indicating current progress of the media asset being displayed. For example, control circuitry 904 may determine from a first time code that the current progress point in a media asset is thirty minutes from the beginning of the media asset. The time code may be a numerical representation of the number of frames of the movie presented at a particular point in time. In the example above, control circuitry 904 may retrieve the time code (00:30:00:00) corresponding to (hour:minute:second:frame).

Process 1600 continues to 1606, where control circuitry 904 accesses, from a database containing a plurality of data structures associated with media assets, a first data structure corresponding to the media asset. For example, control circuitry 904 accesses a database, which may be stored locally in memory (e.g., storage 908), or remotely at a media guidance data source (e.g., media guidance data source 1018) accessible via a communications network (e.g., communications network 1014), as described further in FIGS. 9-10. The database may be organized into a variety of tables each associated with a media asset and where an index table points to the tables associated with media assets contained in the database, as described further in FIG. 6. Alternatively, the database may be organized where data relating to each media asset is stored in an instance of an object of a media asset information class, as is typical of object-oriented programming languages such as C++.

Process 1600 continues to 1608, where control circuitry 904 determines, from the first data structure, whether the first time code is adjacent to or equivalent to a starting point of a segment in the media asset including inappropriate content. For example, control circuitry 904 may determine that a media asset is currently at a particular progress point given by the first time code, such as (00:33:10:10). The first time code used for purposes of comparison with the stored time codes in the first data structure may be the current progress point of the censored version (e.g., censored version 204) or the uncensored version. Control circuitry 904 may determine that because (00:33:10:10) is defined in the first data structure as the beginning of a segment containing profanity, the progress in the media asset corresponds to a segment containing inappropriate content.

If control circuitry 904 determines the first time code is not adjacent to or equivalent to a starting point of a segment in the media asset including inappropriate content, process 1600 may return to 1604, where control circuitry 904 determines a first time code indicating current progress of the media asset being displayed. For example, control circuitry 904 may continually monitor for segments containing inappropriate content by comparing the progress of the media asset (based on retrieving time codes) with the database defining segments containing inappropriate content.

If control circuitry 904 determines the first time code is not adjacent to or equivalent to a starting point of a segment in the media asset including inappropriate content, process 1600 returns to 1604, where control circuitry 904 determines a first time code indicating current progress of the media asset being displayed. In this way, control circuitry 904 continually monitors the progress of the media asset and compares the progress with entries in the data structure corresponding to the media asset for segments containing inappropriate content.

If control circuitry 904 determines the first time code is adjacent to or equivalent to a starting point of a segment in the media asset including inappropriate content, process 1600 continues to 1610, where control circuitry 904 generates for display an alert that the segment of the media asset is available for access on the second device. For example, control circuitry 904 generates for display the alert (e.g., alert 210), which graphically notifies a parent watching the censored version (e.g., censored version 204) of the media asset with a child on the television that an uncensored version of the segment is available on the second device (e.g., tablet 206). The alert could include text, such as, "Uncensored content is available on you tablet." Other features that may be included with the alert are included in FIGS. 17-19 below.

Process 1600 continues to 1612, where control circuitry 904 generates for display the segment of the media asset on the second device. For example, control circuitry 904 requests from a media content source (e.g., media content source 1016), such as a headend server, the uncensored version of the media asset. Control circuitry 904 then generates for display the segment of the uncensored version on the second device (e.g., display 208 of tablet 206).

Process 1600 continues to 1614, where control circuitry 904 determines a second time code indicating current progress of the media asset being displayed. For example, control circuitry 904 continuously monitors the current progress in the media asset by determining time codes according to the process outlined above for determining the first time code and as outlined in FIG. 13. At a given point, control circuitry 904 determines a second time code, which for example may have a value of (00:33:30:15).

Process 1600 continues to 1616, where control circuitry 904 determines, from the first data structure, whether the second time code is adjacent to or equivalent to an ending point of the segment. For example, control circuitry 904 determines the second time code is adjacent to or equivalent to the ending point of the segment in the same manner as that described above in FIG. 11.

If control circuitry 904 determines the second time code is adjacent to or equivalent to an ending point of the segment, process 1600 continues to 1618, where control circuitry 904 ceases generating for display the uncensored version of the media asset by the second device. For example, control circuitry 904 determines that the segment containing the inappropriate content has ended and automatically ceases display of the uncensored version of the media asset on the second device (e.g., tablet 206). Control circuitry 904 continues to generate for display the censored version (e.g., censored version 204 on display 202), since there is no difference in content between the versions during these segments.

If control circuitry 904 determines the second time code is not adjacent to or equivalent to an ending point of the segment, process 1600 returns to 1612, where control circuitry 904 continues to generate for display the segment of the media asset on the second device. For example, control circuitry 904 generates the entire segment containing inappropriate content defined by the entry in the data structure corresponding to the media asset from the starting point to the ending point. Control circuitry 904 continually monitors the progress of the media asset (via time codes) to determine when to cease generating for display the segment, as described above.

Figure 17:
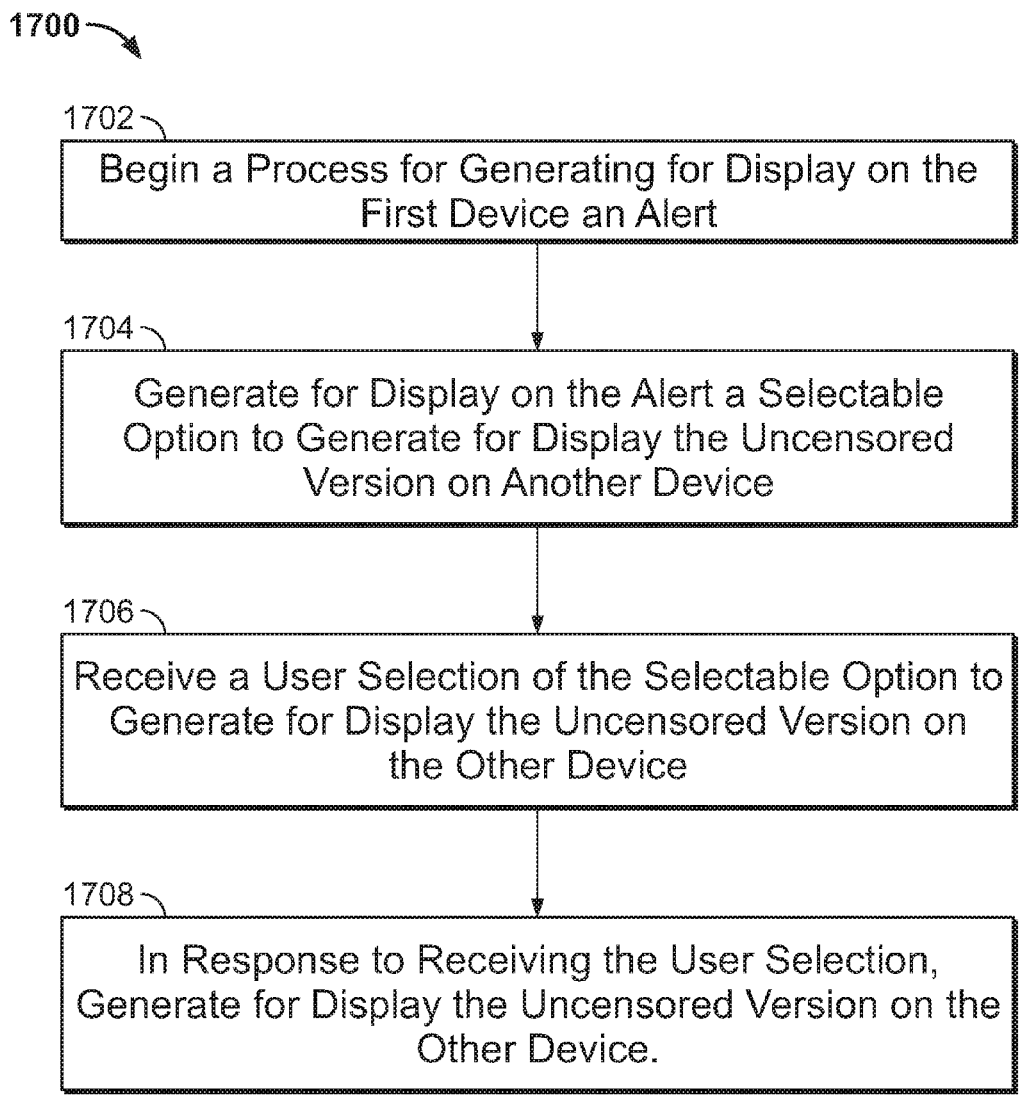
FIG. 17 is a flowchart of illustrative steps for generating for display on the first device an alert, in accordance with some embodiments of the disclosure.

FIG. 17 is a flowchart of illustrative steps for generating for display on the first device an alert, in accordance with some embodiments of the disclosure. For example, a media guidance application implementing process 1700 may be executed by control circuitry 904 (FIG. 9). Process 1700 begins at 1702, where control circuitry 904 begins a process for generating for display on the first device an alert.

Process 1700 continues to 1704, where control circuitry 904 generates for display on the alert a selectable option to generate for display the uncensored version on another device. For example, control circuitry 904 generates for display on the alert (e.g., alert 310) a selectable button (e.g., selectable button 312) containing text, "Yes, Transmit." Control circuitry 904 may additionally include a selectable option (e.g., selectable option 314) to close the alert 310. The selectable option to close the alert could include text, such as, "No, Close."

Process 1700 continues to 1706, where control circuitry 904 receives a user selection of the selectable option to generate for display the uncensored version to the other device. For example, control circuitry 904 receives a selection by a user, via a user input interface, of the selectable button (e.g., selectable button 312) to "Yes, Transmit" the uncensored content.

Process 1700 continues to 1708, where control circuitry 904, in response to receiving the user selection, generates for display the uncensored version to the other device. For example, after selection of the selectable button (e.g., selectable button 312) to "Yes, Transmit" the uncensored version by the user, control circuitry 904 generates the uncensored version for display on the second device (e.g., display 308 of tablet 306).

Figure 18:
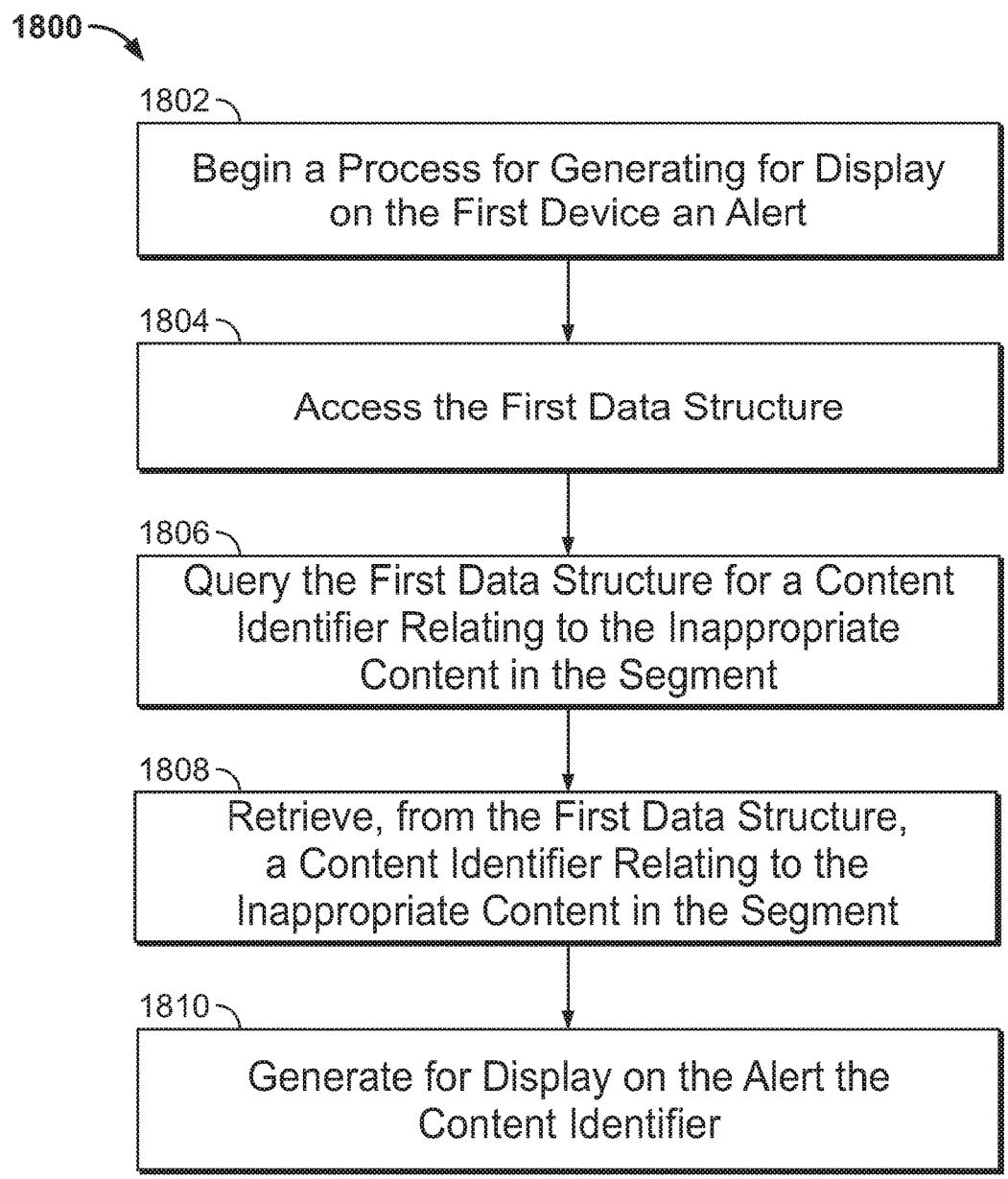
FIG. 18 is a flowchart of illustrative steps for generating for display on the first device an alert, in accordance with some embodiments of the disclosure.

FIG. 18 is a flowchart of illustrative steps for generating for display on the first device an alert, in accordance with some embodiments of the disclosure. For example, a media guidance application implementing process 1800 may be executed by control circuitry 904 (FIG. 9). Process 1800 begins at 1802, where control circuitry 904 begins a process for generating for display on the first device an alert.

Process 1800 continues to 1804, where control circuitry 904 accesses the first data structure. For example, control circuitry 904 may access the first data structure corresponding to the media asset in the same manner as that described above (e.g., FIG. 6).

Process 1800 continues to 1806, where control circuitry 904 queries the first data structure for a content identifier relating to the inappropriate content in the segment. For example, control circuitry 904 queries the data structure for an identifier of the inappropriate content from a content identifier field by executing a database query language script, such as SQL, for instance utilizing the declarative "Select" command to access data in the particular expression (e.g., the content identifier field).

Process 1800 continues to 1808, where control circuitry 904 retrieves, from the first data structure, a content identifier relating to the inappropriate content in the segment. For example, control circuitry 904 may retrieve a string, such as "Profanity," as a result of executing the SQL script.

Process 1800 continues to 1810, where control circuitry 904 generates for display on the alert the content identifier. For example, control circuitry 904 generates for display on the alert (e.g., alert 410) text (e.g., text 412), "This segment of the uncensored version contains: Profanity," which informs the parent what sort of inappropriate content they will miss by continuing to view the censored version with the child.

Figure 19:
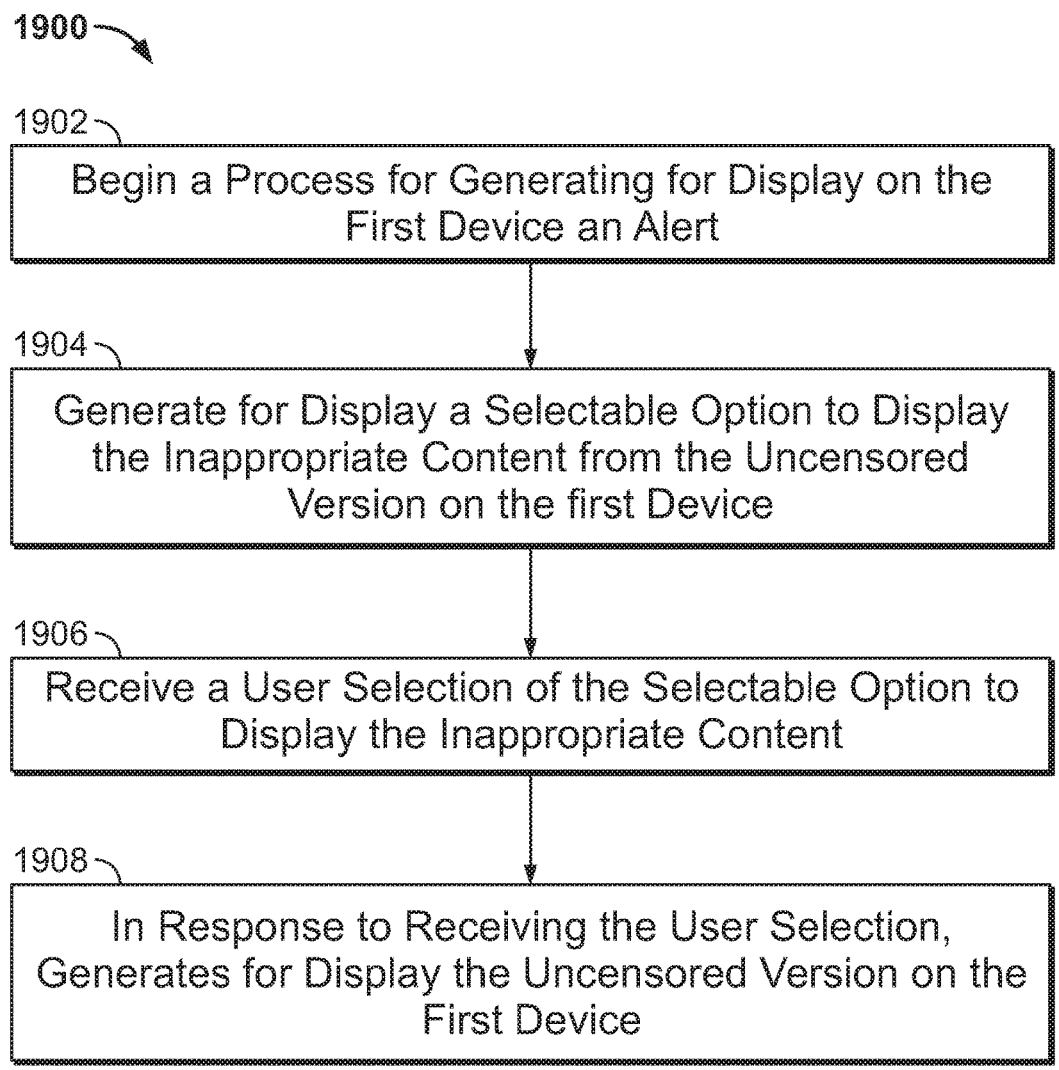
FIG. 19 is a flowchart of illustrative steps for generating for display on the first device an alert, in accordance with some embodiments of the disclosure.

FIG. 19 is a flowchart of illustrative steps for generating for display on the first device an alert, in accordance with some embodiments of the disclosure. For example, a media guidance application implementing process 1900 may be executed by control circuitry 904 (FIG. 9). Process 1900 begins at 1902, where control circuitry 904 begins a process for generating for display on the first device an alert.

Process 1900 continues to 1904, where control circuitry 904 generates for display a selectable option to display the inappropriate content from the uncensored version on the first device. For example, control circuitry 904 generates for display with the alert (e.g., alert 510) a selectable option (e.g., selectable option 512) including text, "Swap versions."

Process 1900 continues to 1906, where control circuitry 904 receives a user selection of the selectable option to display the inappropriate content. For example, control circuitry 904 receives a selection by a user, via a user input interface, of a selectable option (e.g., selectable option 512) to "Swap versions" of the media asset.

Process 1900 continues to 1908, where control circuitry 904, in response to receiving the user selection, generates for display the uncensored version on the first device. For example, control circuitry 904 generates for display the uncensored version of the media asset on display (e.g., display 502) instead of the censored version. The media guidance application may continue to generate for display the uncensored version of the media asset on the second device (e.g., tablet 506). Alternatively, the media guidance application may generate for display the censored version of the media asset on the second device (e.g., tablet 506).

Figure 20:
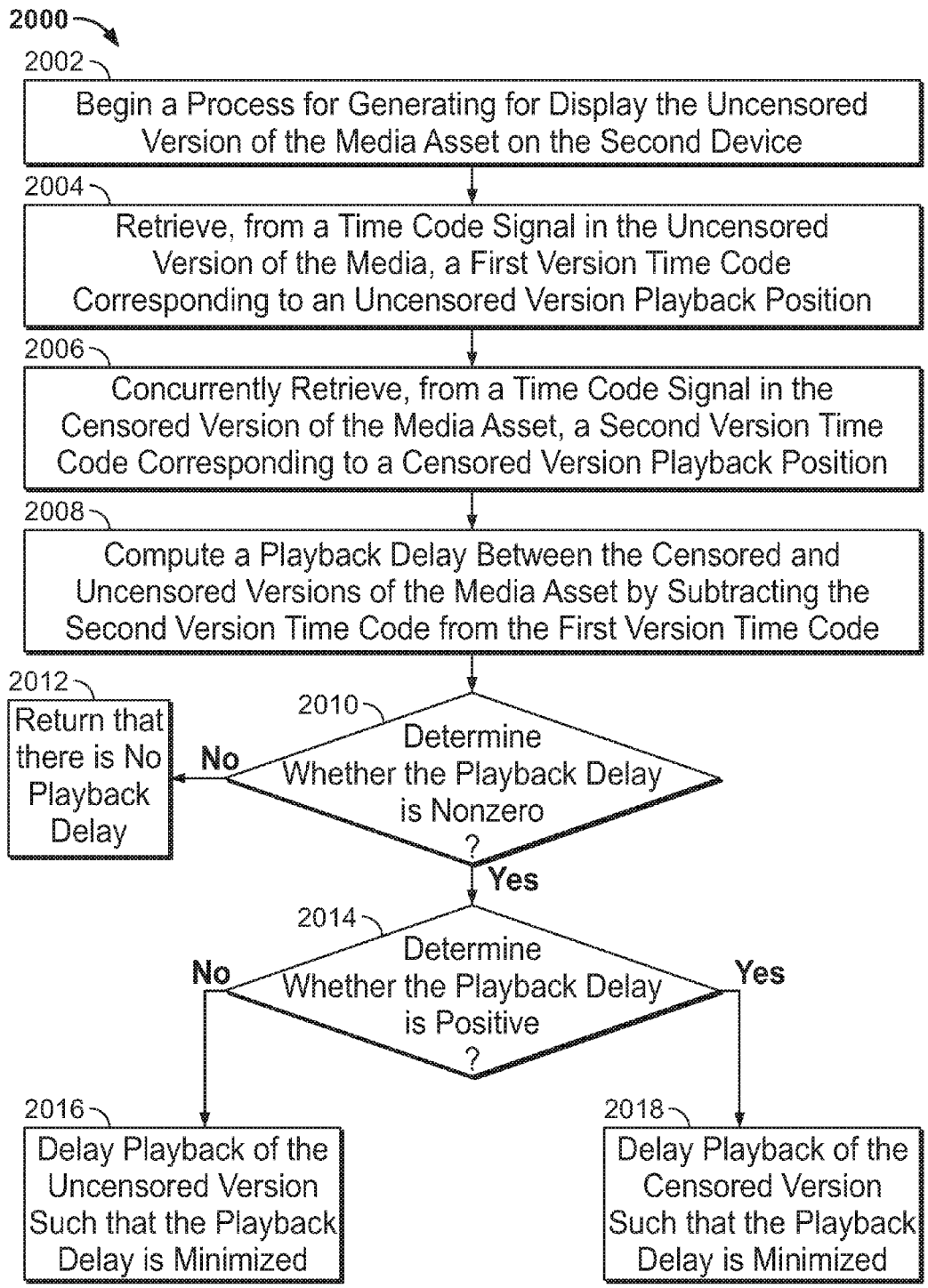
FIG. 20 is a flowchart of illustrative steps for generating for display the uncensored version of the media asset on the second device, in accordance with some embodiments of the disclosure.

FIG. 20 is a flowchart of illustrative steps for generating for display the uncensored version of the media asset on the second device, in accordance with some embodiments of the disclosure. For example, a media guidance application implementing process 2000 may be executed by control circuitry 904 (FIG. 9). Process 2000 begins at 2002, where control circuitry 904 begins a process for generating for display the uncensored version of the media asset on the second device.

Process 2000 continues to 2004, where control circuitry 904 retrieves, from a time code signal in the uncensored version of the media, a first version time code corresponding to an uncensored version playback position. For example, control circuitry 904 retrieves the first version time code, for example (00:33:30:10), in the manner described previously for determining time codes.

Process 2000 continues to 2006, where control circuitry 904 concurrently retrieves, from a time code signal in the censored version of the media asset, a second version time code corresponding to a censored version playback position. For example, control circuitry 904 retrieves the second version time code, for example (00:33:29:10), in the manner described previously for determining time codes.

Process 2000 continues to 2008, where control circuitry 904 computes a playback delay between the censored and uncensored versions of the media asset by subtracting the second version time code from the first version time code. For example, control circuitry 904 subtracts the values in the time codes and determines a playback delay of +1 second. The playback delay could arise because of unequal lengths in the runtime of the uncensored segments versus the censored segments.

Process 2000 continues to 2010, where control circuitry 904 determines whether the playback delay is nonzero. If the playback delay is zero, process 2000 continues to 2012, where control circuitry 904 returns that there is no playback delay. For example, control circuitry 904 determines that the two versions are perfectly synchronized and no playback adjustment is required for either. If the playback delay is nonzero, process 2000 continues to 2014, where control circuitry 904 determines whether the playback delay is positive.

If the playback delay is not positive, process 2000 continues to 2016, where control circuitry 904 delays playback of the uncensored version such that the playback delay is minimized. For example, since control circuitry 904 determined that the censored version is at an earlier progress point than the uncensored version, control circuitry 904 delays playback of the uncensored version.

If the playback delay is positive, process 2000 continues to 2018, where control circuitry 904 delays playback of the censored version such that the playback delay is minimized. For example, since control circuitry 904 determined that the uncensored version is at an earlier progress point than the censored version, control circuitry 904 delays playback of the censored version.

It is contemplated that the steps or descriptions of each of FIGS. 11-20 may be used with any other embodiment of this disclosure. In addition, the steps and descriptions described in relation to FIGS. 11-20 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-10 could be used to perform one or more of the steps in FIGS. 11-20.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method alerting a user that a segment of an uncensored version of a media asset is available on a second device while a censored version of the media asset is displayed on a first device, the method comprising:
    generating for display the censored version of the media asset on the first device;
    determining a first time code indicating current progress of the media asset being displayed;
    accessing, from a database containing a plurality of data structures associated with media assets, a first data structure corresponding to the media asset;
    determining, from the first data structure, whether the first time code is adjacent to or equivalent to a starting point of a segment in the media asset including inappropriate content;
    in response to determining that the first time code is adjacent to or equivalent to the starting point of the segment:
        generating for display an alert that the segment of the media asset is available for access on the second device;
        generating for display the segment of the media asset on the second device;
        determining a second time code of the media asset being displayed; and
    upon determining that the second time code is adjacent to or equivalent to the ending point, ceasing generating for display the uncensored version of the media asset by the second device.

2. The method of claim 1, wherein generating for display on the first device the alert comprises:
    generating for display on the alert a selectable option to transmit the uncensored version to the second device;
    receiving a user selection of the selectable option to display the uncensored version to the second device; and
    in response to receiving the user selection, generating for display the uncensored version on the second device.

3. The method of claim 1, wherein generating for display on the first device the alert comprises:
    retrieving, from the first data structure, a content identifier relating to the inappropriate content in the segment; and
    generating for display on the alert the content identifier.

4. The method of claim 1, wherein generating for display on the first device the alert comprises:
    generating for display a selectable option to display the inappropriate content from the uncensored version on the first device;
    receiving a user selection of the selectable option to display the inappropriate content; and
    in response to receiving the user selection, generating for display the uncensored version on the first device.

5. The method of claim 1, wherein generating for display the uncensored version of the media asset on the second device comprises:
retrieving, from a time code signal in the uncensored version of the media, a first version time code corresponding to an uncensored version playback position;
concurrently retrieving, from a time code signal in the censored version of the media asset, a second version time code corresponding to a censored version playback position;
computing a playback delay between the censored and uncensored versions of the media asset by subtracting the second version time code from the first version time code; and
delaying playback of either the censored version or the uncensored version such that the playback delay is minimized.

6. The method of claim 1, wherein determining the first time code comprises:
retrieving, from a time code signal in the media asset, a set of binary coded decimal values referring to a present playback position in the media asset; and
converting each binary coded decimal value to a corresponding decimal value corresponding to the first time code.

7. The method of claim 1, wherein determining, from the first data structure, whether the first time code is adjacent to or equivalent to the starting point of the segment in the media asset including inappropriate content comprises:
comparing the first time code to a plurality of starting points stored in the first data structure;
determining whether the first time code is adjacent to or equivalent to a first starting point of the plurality of starting points;
determining whether the first starting point is associated with inappropriate content; and
in response to determining that the first time code is adjacent to or equivalent to the first starting point and is associated with inappropriate content, determining that the first starting point is adjacent to or equivalent to the starting point of the segment containing inappropriate content.

8. The method of claim 7, wherein comparing the first time code to the plurality of starting points comprises:
retrieving a value of the first starting point from the first data structure;
computing an adjusted first starting point by subtracting a first time offset from the first starting point; and
comparing the first time code to the adjusted first starting point.

9. The method of claim 8, further comprising:
presenting to the user a plurality of time offset options;
receiving a user selection of a first time offset option of the plurality of time offset options; and
storing, in a time offset field of a user profile stored in the database, the time offset option as the first time offset.

10. The method of claim 1, wherein generating for display the segment of the media asset on the second device comprises:
querying the second device for connection information relating to peripheral devices;
determining, from the connection information, whether headphones are connected to the second device; and
in response to determining no headphones are connected to the second device, preventing display of the segment of the uncensored version of the media asset.

11. A system for alerting a user that a segment of an uncensored version of a media asset is available on a second device while a censored version of the media asset is displayed on a first device, the system comprising:
display circuitry;
storage circuitry; and
control circuitry configured to:
generate for display the censored version of the media asset on the first device;
determine a first time code indicating current progress of the media asset being displayed;
access, from a database containing a plurality of data structures associated with media assets, a first data structure corresponding to the media asset;
determine, from the first data structure, whether the first time code is adjacent to or equivalent to a starting point of a segment in the media asset including inappropriate content;
in response to determining that the first time code is adjacent to or equivalent to the starting point of the segment:
generate for display an alert that the segment of the media asset is available for access on the second device;
generate for display the segment of the media asset on the second device;
determine a second time code of the media asset being displayed; and
upon determining that the second time code is adjacent to or equivalent to the ending point, cease generating for display the uncensored version of the media asset by the second device.

12. The system of claim 11, wherein the control circuitry configured to generate for display on the first device the alert is further configured to:
generate for display on the alert a selectable option to transmit the uncensored version to the second device;
receive a user selection of the selectable option to display the uncensored version to the second device; and
in response to receiving the user selection, generate for display the uncensored version on the second device.

13. The system of claim 11, wherein the control circuitry configured to generate for display on the first device the alert is further configured to:
retrieve, from the first data structure, a content identifier relating to the inappropriate content in the segment; and
generate for display on the alert the content identifier.

14. The system of claim 11, wherein the control circuitry configured to generate for display on the first device the alert is further configured to:
generate for display a selectable option to display the inappropriate content from the uncensored version on the first device;
receive a user selection of the selectable option to display the inappropriate content; and
in response to receiving the user selection, generate for display the uncensored version on the first device.

15. The system of claim 11, wherein the control circuitry configured to generate for display the uncensored version of the media asset on the second device is further configured to:
retrieve, from a time code signal in the uncensored version of the media, a first version time code corresponding to an uncensored version playback position;
concurrently retrieve, from a time code signal in the censored version of the media asset, a second version time code corresponding to a censored version playback position;

compute a playback delay between the censored and uncensored versions of the media asset by subtracting the second version time code from the first version time code; and delay playback of either the censored version or the uncensored version such that the playback delay is minimized.

16. The system of claim 11, wherein the control circuitry configured to determine the first time code is further configured to:

retrieve, from a time code signal in the media asset, a set of binary coded decimal values referring to a present playback position in the media asset; and convert each binary coded decimal value to a corresponding decimal value corresponding to the first time code.

17. The system of claim 11, wherein the control circuitry configured to determine, from the first data structure, whether the first time code is adjacent to or equivalent to the starting point of the segment in the media asset including inappropriate content is further configured to:

compare the first time code to a plurality of starting points stored in the first data structure;

determine whether the first time code is adjacent to or equivalent to a first starting point of the plurality of starting points;

determine whether the first starting point is associated with inappropriate content; and in response to determining that the first time code is adjacent to or equivalent to the first starting point and is associated with inappropriate content, determine that the first starting point is adjacent to or equivalent to the starting point of the segment containing inappropriate content.

18. The system of claim 17, wherein the control circuitry configured to compare the first time code to the plurality of starting points is further configured to:

retrieve a value of the first starting point from the first data structure;

compute an adjusted first starting point by subtracting a first time offset from the first starting point; and compare the first time code to the adjusted first starting point.

19. The system of claim 18, wherein the control circuitry is further configured to:

present to the user a plurality of time offset options;

receive a user selection of a first time offset option of the plurality of time offset options; and store, in a time offset field of a user profile stored in the database, the time offset option as the first time offset.

20. The system of claim 11, wherein the control circuitry configured to generate for display the segment of the media asset on the second device is further configured to:

query the second device for connection information relating to peripheral devices;

determine, from the connection information, whether headphones are connected to the second device; and in response to determining no headphones are connected to the second device, prevent display of the segment of the uncensored version of the media asset.

* * * * *